US 7,057,756 B2

(12) United States Patent
Ogasahara et al.

(10) Patent No.: US 7,057,756 B2
(45) Date of Patent: Jun. 6, 2006

(54) IMAGE PROCESSOR, METHOD FOR PROCESSING IMAGE, PRINTING APPARATUS, PRINTING METHOD, PROGRAM, AND STORAGE MEDIUM THAT STORES COMPUTER-READABLE PROGRAM CODE

(75) Inventors: Takayuki Ogasahara, Kanagawa (JP); Hiroshi Tajika, Kanagawa (JP); Miyuki Fujita, Tokyo (JP); Yuji Konno, Kanagawa (JP); Norihiro Kawatoko, Kanagawa (JP); Tetsuya Edamura, Kanagawa (JP); Tetsuhiro Maeda, Kanagawa (JP); Atsuhiko Masuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 09/903,609

(22) Filed: Jul. 13, 2001

(65) Prior Publication Data
US 2002/0080394 A1 Jun. 27, 2002

(30) Foreign Application Priority Data
Jul. 17, 2000 (JP) ............................. 2000-216699
Aug. 31, 2000 (JP) ............................. 2000-264355
Jun. 29, 2001 (JP) ............................. 2001-199988

(51) Int. Cl.
*G06F 15/00* (2006.01)
(52) U.S. Cl. .................... 358/1.15; 358/1.7; 358/1.8; 358/1.9; 358/3.02; 358/3.1; 358/3.09; 358/3.12; 347/4; 347/15; 347/43; 347/100
(58) Field of Classification Search ............... 358/1.15, 358/1.9, 3.02, 3.1, 3.09, 3.12, 521, 534; 347/4, 347/15, 43, 100; 106/3.27, 31.27
See application file for complete search history.

(56) References Cited

U.S. PATENT DOCUMENTS

| 4,313,124 | A | 1/1982 | Hara |
| 4,345,262 | A | 8/1982 | Shirato et al. |
| 4,459,600 | A | 7/1984 | Sato et al. |
| 4,463,359 | A | 7/1984 | Ayata et al. |
| 4,558,333 | A | 12/1985 | Sugitani et al. |
| 4,608,577 | A | 8/1986 | Hori |
| 4,723,129 | A | 2/1988 | Endo et al. |
| 4,740,796 | A | 4/1988 | Endo et al. |
| 5,825,377 | A | 10/1998 | Gotoh et al. |

(Continued)

FOREIGN PATENT DOCUMENTS

EP 0 919 388 6/1999

(Continued)

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

The present invention reduces the granularity of the dots for the entire density range by optimally setting formation amounts of a low-density dot and of a high-density dot per unit area. For this purpose, the formation amounts of the low-density dot and of the high-density dot in accordance with the density level are determined in such a way that as the density level rises, the formation amount of the low-density dot is gradually increased up to a first peak amount (200%) and, after reaching the first peak, gradually decreased, and in a range of density levels higher than a predetermined density level at which the low-density dot is formed to a specified amount (200%), as the density level rises, the formation amount of the high-density dot is gradually increased up to a second peak amount (100%) smaller than the first peak amount.

27 Claims, 28 Drawing Sheets

U.S. PATENT DOCUMENTS

| | | | |
|---|---|---|---|
| 6,027,196 A * | 2/2000 | Gotoh et al. | 347/7 |
| 6,113,210 A | 9/2000 | Gotoh et al. | |
| 6,264,305 B1 | 7/2001 | Inui et al. | |
| 6,312,101 B1 * | 11/2001 | Couwenhoven et al. | 358/521 |
| 6,336,704 B1 * | 1/2002 | Shimada | 347/43 |
| 6,382,757 B1 * | 5/2002 | Kakutani | 347/15 |
| 6,435,657 B1 * | 8/2002 | Couwenhoven et al. | 347/43 |
| 6,824,598 B1 * | 11/2004 | Thornberry et al. | 106/31.27 |

FOREIGN PATENT DOCUMENTS

| | | |
|---|---|---|
| EP | 0 970 815 | 1/2000 |
| JP | 54-56847 | 5/1979 |
| JP | 59-123670 | 7/1984 |
| JP | 59-138461 | 8/1984 |
| JP | 60-71260 | 4/1985 |

* cited by examiner

DOT AREA VERSUS UNIT PIXEL AREA

| | RESOLUTION | 600dpi | 720dpi | 1200dpi | 1440dpi | 2400dpi |
|---|---|---|---|---|---|---|
| | UNIT PIXEL AREA | 1792μm² | 1245μm² | 448μm² | 311μm² | 112μm² |
| DOT DIAMETER 30μm | 706.84μm | 0.39 | 0.57 | 1.58 | 2.27 | 6.31 |
| DOT DIAMETER 35μm | 962.08μm | 0.54 | 0.77 | 2.15 | 3.09 | 8.59 |
| DOT DIAMETER 40μm | 1256.6μm | 0.70 | 1.01 | 2.80 | 4.04 | 11.22 |
| DOT DIAMETER 50μm | 1963.4μm | 1.10 | 1.58 | 4.38 | 6.31 | 17.53 |
| DOT DIAMETER 70μm | 3848.3μm | 2.15 | 3.09 | 8.59 | 12.37 | 34.36 |

FIG.20

CORRELATION BETWEEN VALUE OF GRANULARITY EVALUATION
FUNCTION AND SUBJECTIVE EVALUATION

| GRANULARITY | ≦0.4 | 0.4~0.6 | 0.6~0.8 | ≧0.8 |
|---|---|---|---|---|
| SUBJECTIVE EVALUATION (GRANULARITY) | ◎ (EXTREMELY EXCELLENT) | ○ (EXCELLENT) | ● (POOR) | △ (EXTREMELY POOR) |
| RESULT | NO DOTS ARE NOTICEABLE AT ALL | DOTS ARE NOTICEABLE WITH REDUCED DISTANCE | DOTS ARE NOTICEABLE WITH LEAST DISTANCE OF DISTINCT VISION | ROUGHNESS OF DOTS IS REMARKABLE |

FIG.25

IMAGE PROCESSOR, METHOD FOR PROCESSING IMAGE, PRINTING APPARATUS, PRINTING METHOD, PROGRAM, AND STORAGE MEDIUM THAT STORES COMPUTER-READABLE PROGRAM CODE

This application is based on Japanese Patent Application Nos. 2000-216699 filed Jul. 17, 2000, 2000-264355 filed Aug. 31, 2000 and 2001-199988 filed Jun. 29, 2001, the content of which is incorporated hereinto by reference.

BACKGROUND OF THE INVENTION

1. Field of the Invention

The present invention relates to an image processor and an image processing method for determining formation volumes of a high-density dot and of a low-density dot for a printing medium, a printing apparatus and a printing method that use the same, a program, and a storage medium that stores a computer-readable program code.

2. Description of the Related Art

As the conventional ink-jet printing apparatus, there is, for example, an apparatus that uses three color inks of cyan (C), magenta (M), and yellow (Y), or four color inks of cyan, magenta, yellow, and black (K) and forms a dot by applying these inks with a printing medium. In such a printing apparatus, there is a case where the dots become noticeable in a highlight portion (low-density area) of an image, resulting in large granularity. As a method for reducing such granularity of the dots, there is a method where a light ink whose ink density is as small as ⅓ to ⅙ or so of those of the normal inks is also used for the inks of low intensity, such as cyan and magenta. As the printing method using the light inks, there are the following three schemes.

(1) A highlight portion is applied with the light ink, and a shadow portion (high-density area) is applied with the light ink by overlap.

(2) The highlight portion is applied with the light ink, and the shadow portion is applied with a dark ink.

(3) The highlight portion is applied with the light ink, the medium-density portion is applied with a medium-density ink, and the shadow portion is applied with the dark ink.

In the printing style of the above-mentioned case (1), consumption of the light inks becomes larger as compared to the normal printing and hence a running cost becomes high, because the density in the shadow portion is intended to be deepened by ejecting the light ink in an overlapping manner. In addition, the applying amount of the inks is increased to ensure the density of image, and increase of the applying amount of the inks causes the inks to overflow on a printing medium, especially when printing is done for secondary colors, tertiary colors, etc., resulting in deterioration in image quality. Moreover, because of the existence of the maximum possible applying amount of the ink, available printing mediums are limited.

In the printing style of the above-mentioned case (2), by using inks properly for the highlight portion and the shadow portion, coexistence of reduction in the granularity in the highlight portion, and enhancement of the density in the shadow portion as well as reduction of ink consumption are intended to be established. However, in the case where the concentration of the light ink is reduced as thin as possible, although the granularity in the highlight portion becomes small, the dots become noticeable in a medium-density range where the dark ink starts to mingle in an area formed by the dots of the light ink because of existence of a large difference between the densities of the light ink and of the dark ink on a printing medium. On the other hand, in the case where the density of the light ink is increased with the intention of reducing the granularity of the dots in the medium-density range, the dot of the light ink becomes noticeable and the granularity increases in the highlight portion because the dots come into prominence there.

In the printing style of the above-mentioned case (3), by using the medium-density ink, the granularity of the dots becomes small in the medium-density range. However, it is necessary to prepare both three printing heads each for ejecting one of the light ink, the medium-density ink, and the dark ink, and three types of the inks for a single hue and it becomes a major factor of increase in cost. In addition, when performing image processing, it is necessary to provide three tables of color for a single hue, which leads to complicated image processing.

Moreover, as a printing style that does not use the light inks, for example, there is a method such that an ink droplet for forming the dot is reduced to a small droplet of approximately 0.5 pl (pico liter) to form a dot smaller than that of the normal case, achieving reduced granularity in the highlight portion, with the intention of achieving the same image quality as the above-mentioned cases (1), (2), and (3) that use the light inks. However, this printing method may result in a reduced printing speed because of increased printing resolution, increased difficulty in stably ejecting the ink droplet at a targeted impact position, or the increase in cost because of difficulty in manufacturing the printing head and hence depression of its yield.

SUMMARY OF THE INVENTION

The present invention can provide an image processor, an image processing method, a printing apparatus, a printing method, a control program for controlling the printing apparatus, and a storage medium that stores the program, which can lessen the granularity of the dots for the entire density range by properly setting formation amounts of the low-density dot and of the high-density dot, respectively.

In a first aspect of the present invention, there is provided an image processor equipped with deciding means for deciding formation amounts of a low-density dot and of a high-density dot for a unit area of a printing medium according to a density level of input image data used for printing an image on the printing medium, wherein the deciding means decides the formation amounts of the low-density dot and of the high-density dot in accordance with the density level in such a way that, as the density level rises, the formation amount of the low-density dot is gradually increased up to a first peak amount and, after reaching the first peak amount, gradually decreased, and in a range of density levels higher than a predetermined density level at which the low-density dot is formed in the specified amount, as the density level rises, the formation amount of the high-density dot is gradually increased up to a second peak amount smaller than the first peak amount.

In a second aspect of the present invention, there is provided an image processing method that decides formation amounts of a low-density dot and of a high-density dot for a unit area of a printing medium in accordance with a density level of the input image data used for printing an image on the printing medium, wherein the formation amounts of the low-density dot and of the high-density dot are decided in such a way that, as the density level rises, the formation amount of the low-density dot is gradually increased up to the first peak amount and, after reaching the first peak amount, gradually decreased, and in a range of density levels higher than a predetermined density level at which the low-density dot is formed in specified amount, as the density level rises, the formation amount of the high-density dot is gradually increased up to a second peak amount smaller than the first peak amount.

In a third aspect of the present invention, there is provided a printing apparatus comprising:

an image processing portion for executing an image processing method of the second aspect of the present invention; and a printing portion for forming the low-density dot and the light density dot on a printing medium in accordance with formation amounts of the low-density dot and of the high-density dot that were decided by the image processing portion.

In a fourth aspect of the present invention, there is provided a printing method comprising:

an image processing step for executing one image processing method of the second aspect of the present invention; and a dot forming step for forming the low-density dot and light density dot on a printing medium in accordance with the formation amounts of the low-density dot and of the high-density dot that were decided in the image processing step.

In a fifth aspect of the present invention, there is provided a control program for controlling a printing apparatus that uses a printing portion for forming a low density dot and a high-density dot on a printing medium and prints an image on the printing medium, wherein when deciding formation amounts of a low-density dot and of a high-density dot for a unit area of the printing medium in accordance with the density level of the input image data used for printing the image on the printing medium, the control program makes a computer execute a step of deciding the formation amounts of the low-density dot and of the high-density dot per unit area in accordance with the density level in such a way that, as the density level rises, the formation amount of the low-density dot is gradually increased up to a first peak amount and, after reaching the first peak amount, gradually decreased, and in a range of density levels higher than a predetermined density level at which the low-density dot is formed in the specified amount, as the density level rises, the formation amount of the high-density dot is gradually increased up to a second peak amount smaller than the first peak amount.

In a sixth aspect of the present invention, there is provided a storage medium that stores a computer-readable program code in which a control program of the fifth aspect of the present invention is stored.

According to the present invention, the formation amount of the low-density dot and of the high-density dot are set optimally in such a way that the maximum formation amount of the light dot is enlarged, and hence a density range formed only with the light ink dot expands to a wider range, while a density range in which the dark dot, whose granularity tends to become noticeable, narrows comparatively. Therefore, the granularity of the dots can be reduced for the entire density range.

The above and other objects, effects, features and advantages of the present invention will become more apparent from the following description of embodiments thereof taken in conjunction with the accompanying drawings.

BRIEF DESCRIPTION OF THE DRAWINGS

FIG. 20 is an explanatory drawing of a relationship between the dot area and the unit pixel area;

FIG. 25 is an explanatory drawing of a correlation between a value of an evaluation function of the granularity and subjective evaluation.

DETAILED DESCRIPTION OF THE PREFERRED EMBODIMENTS

Embodiments of the printing apparatus according to the present invention will be described by referring to the accompanying drawings.

In the following description we take up as an example a printing apparatus using an ink jet printing system.

In this specification, a word "print" (or "record") refers to not only forming significant information, such as characters and figures, but also forming images, designs or patterns on printing medium and processing media, whether the information is significant or insignificant or whether it is visible so as to be perceived by humans.

The terms "print medium" and "print sheet" include not only paper used in common printing apparatus, but also cloth, plastic films, metal plates, glass, ceramics, wood, leather or any other material that can receive ink. These terms will be also referred to as "paper".

Further, the word "ink" (or "liquid") should be interpreted in its wide sense as with the word "print" and refers to liquid that is applied to the printing medium to form images, designs or patterns, process the printing medium or process ink (for example, coagulate or make insoluble a colorant in the ink applied to the printing medium).

1. Apparatus Body

Figure 1:
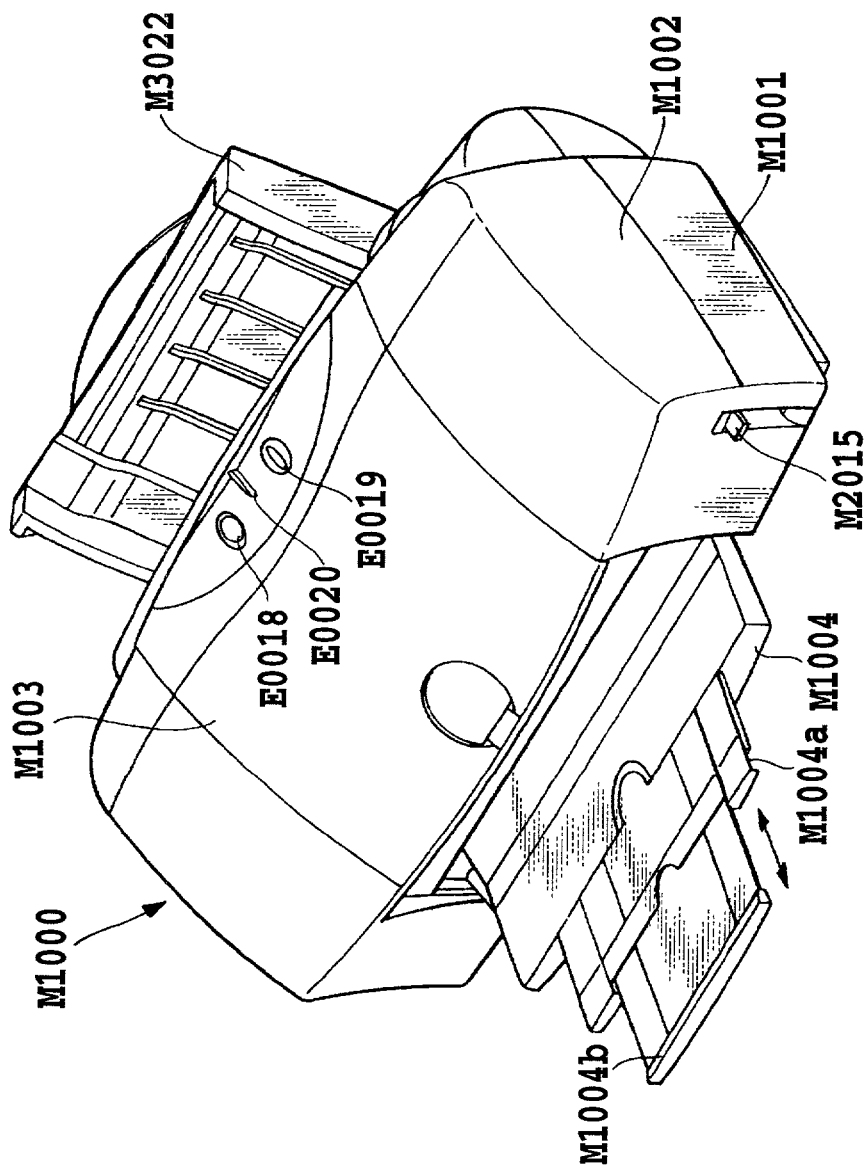
FIG. 1 is a perspective view showing an external construction of an ink jet printer as one embodiment of the present invention.
Figure 2:
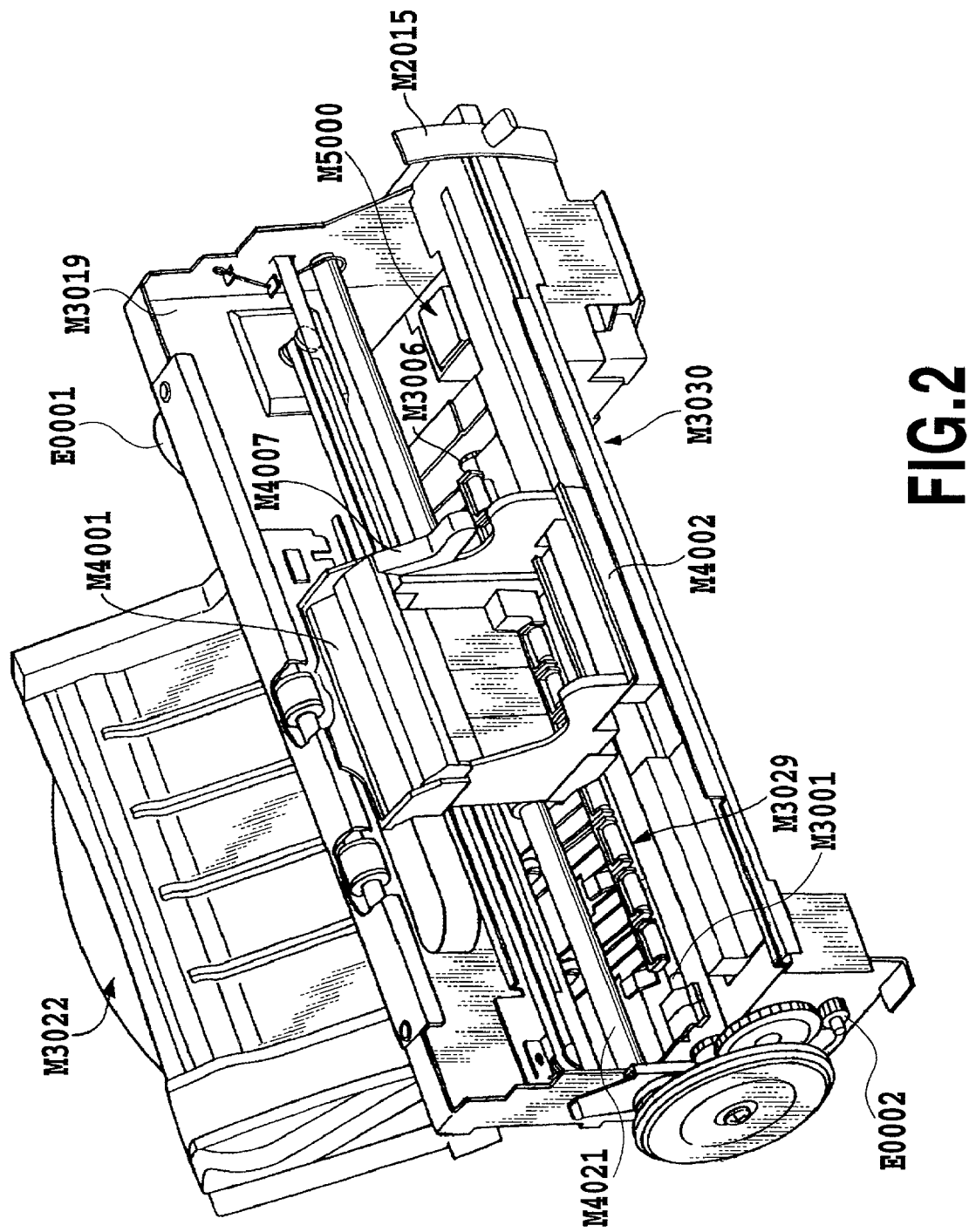
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked.

The discharge tray M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 7) may be sounded. When the trouble is eliminated, the resume key E0019 is pressed to resume the printing.

2. Printing Operation Mechanism

Next, a printing operation mechanism installed and held in the printer body M1000 according to this embodiment will be explained.

The printing operation mechanism in this embodiment comprises: an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position; and an ejection performance recovery unit M5000 to recover the ink ejection performance of the print unit.

Here, the print unit will be described. The print unit comprises a carriage M4001 movably supported on a carriage shaft M4021 and a print head cartridge H1000 removably mounted on the carriage M4001.

2.1 Print Head Cartridge

First, the print head cartridge used in the print unit will be described with reference to FIGS. 3 to 5.

Figure 3:
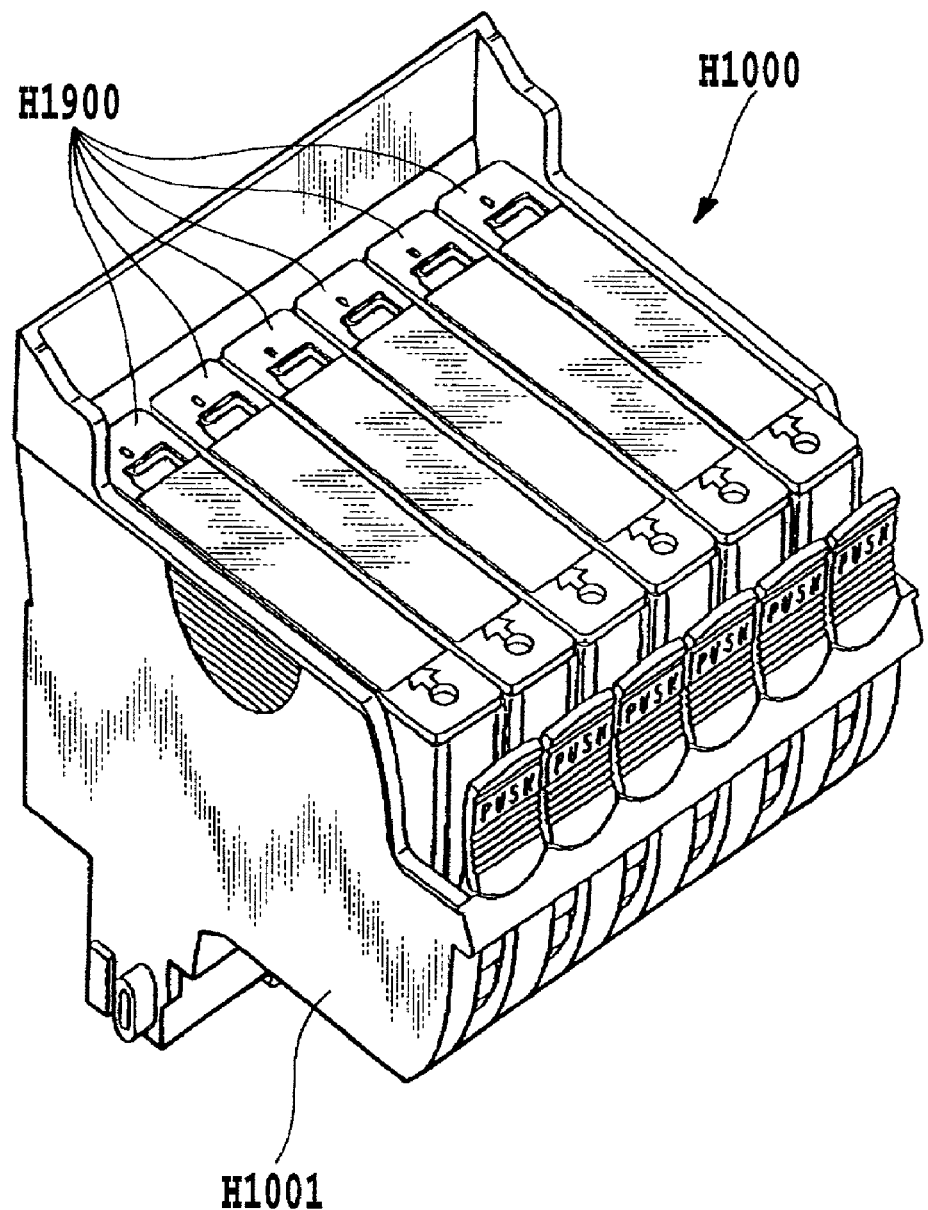
FIG. 3 is a perspective view showing an assembled print head cartridge used in the printer of one embodiment of the present invention.
Figure 4:
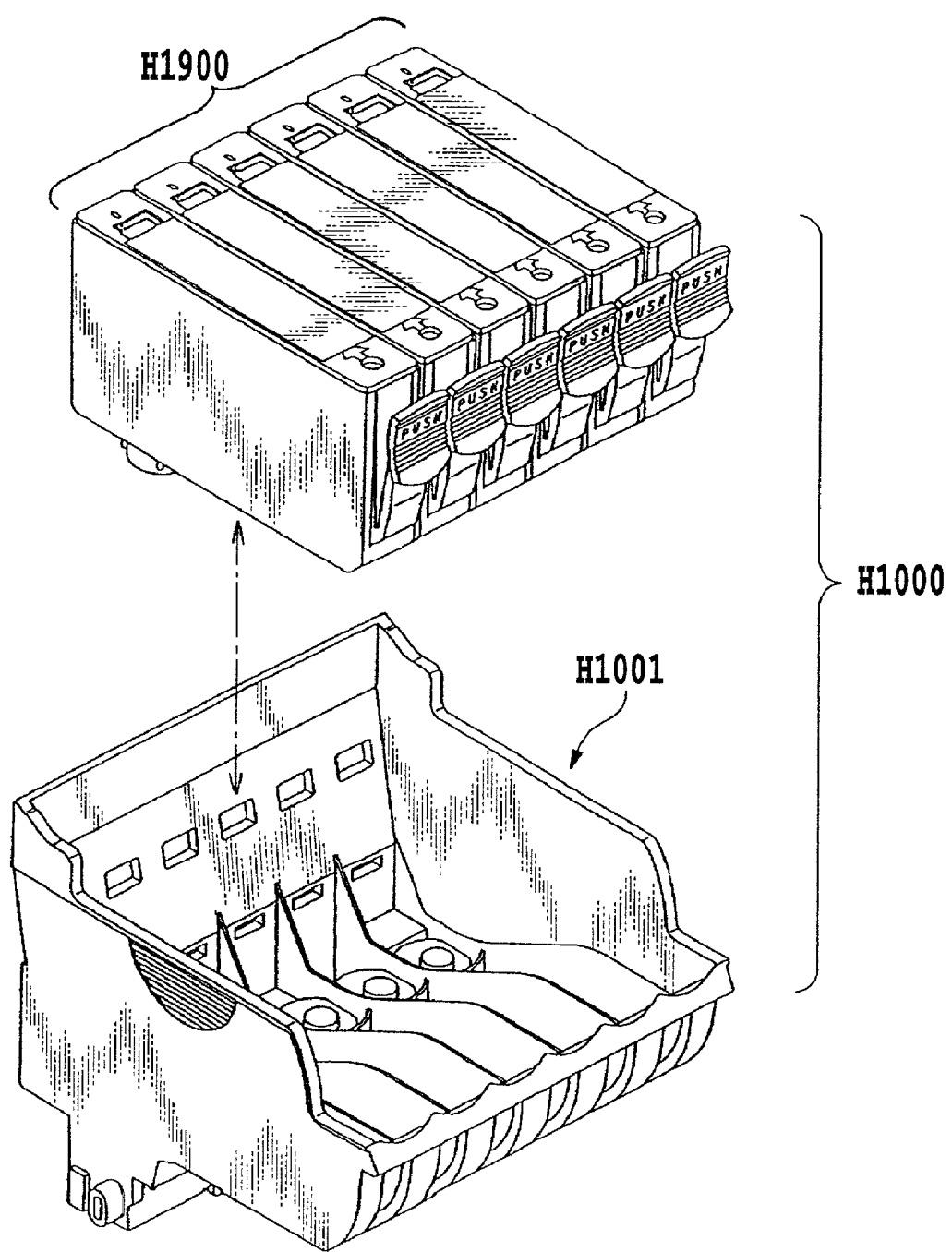
FIG. 4 is an exploded perspective view showing the print head cartridge of FIG. 3.

The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as a photograph. As shown in FIG. 4, these individual ink tanks are removably mounted to the print head H1001.

Figure 5:
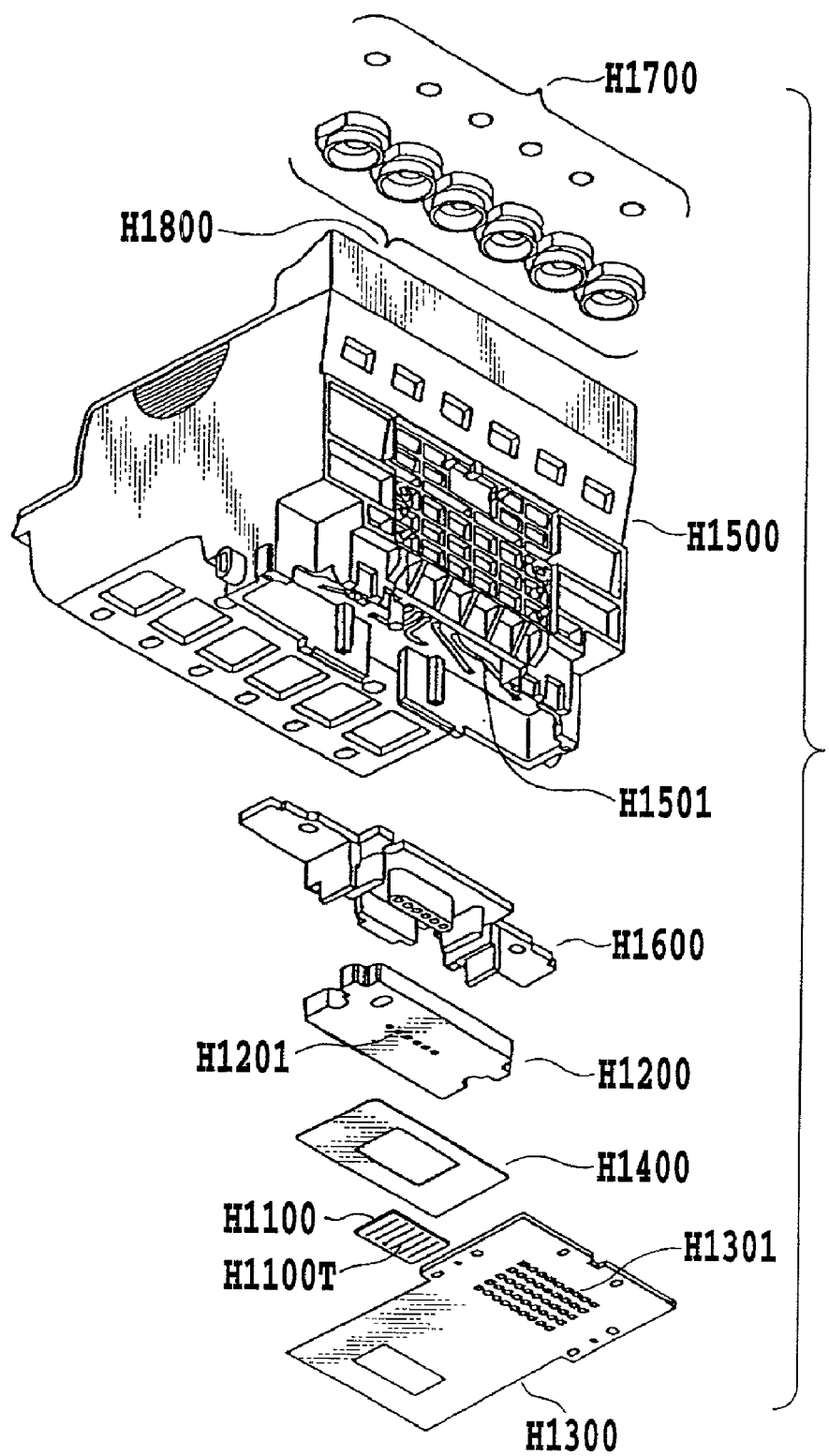
FIG. 5 is an exploded perspective view of the print head of FIG. 4 as seen from diagonally below.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H1100, there are formed ink supply ports for supplying ink to the plurality of ink passages. The print element substrate H1100 is securely bonded to the first plate H1200 which is formed with ink supply ports H1201 for supplying ink to the print element substrate H1100. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined as by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact FPC hereinafter) E0011 whose contact portion electrically contacts a contact portion (external signal input terminals) H1301 provided in the print head H1001 to transfer various information for printing and supply electricity to the print head H1001.

Between the contact portion of the contact FPC E0011 and the carriage M4001 there is an elastic member (not shown), such as a rubber member. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7).

3. Scanner

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the sub-scan direction enables one page of document image information to be read.

Figure 6B:
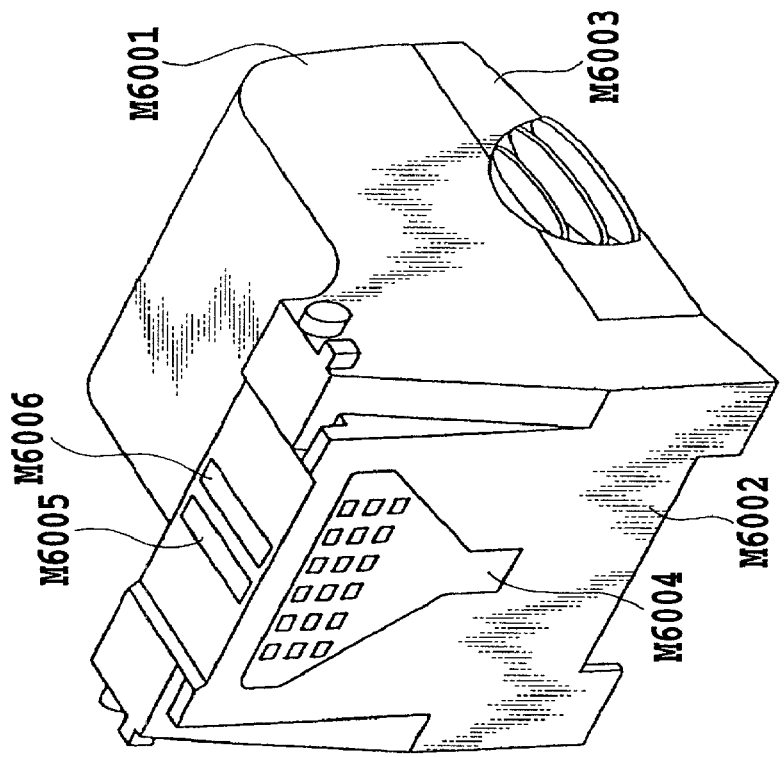
FIGS. 6A and 6B are perspective views showing a construction of a scanner cartridge upside down which can be mounted in the printer of one embodiment of the present invention instead of the print head cartridge of FIG. 3.
Figure 6A:
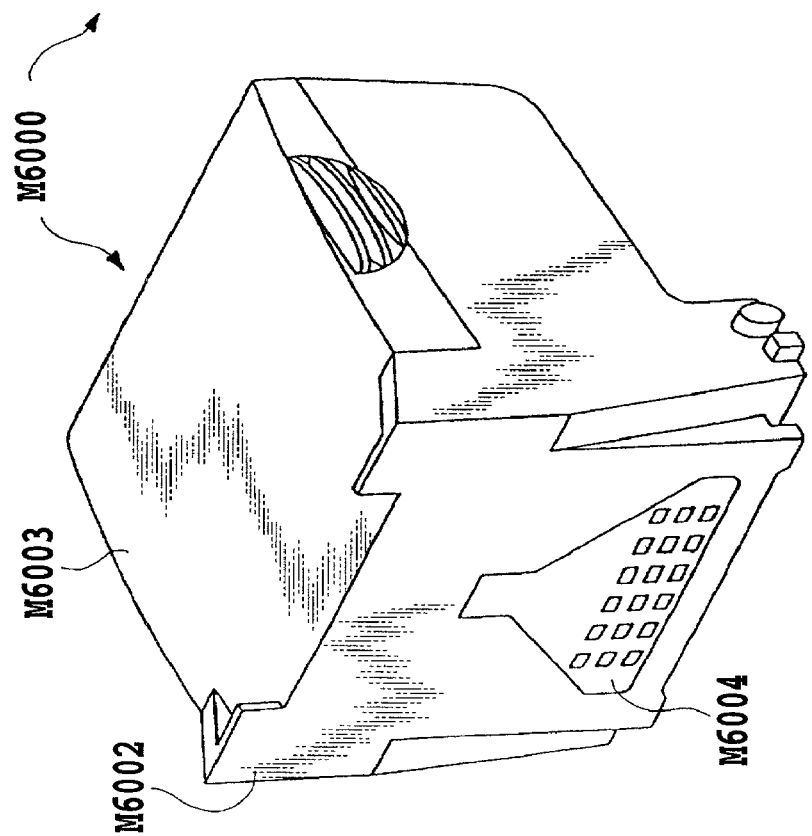

FIGS. 6A and 6B show the scanner M6000 upside down to explain about its outline construction.

As shown in the figure, a scanner holder M6001 is shaped like a box and contains an optical system and a processing circuit necessary for reading. A reading lens M6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source (not shown) inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

Figure 7:
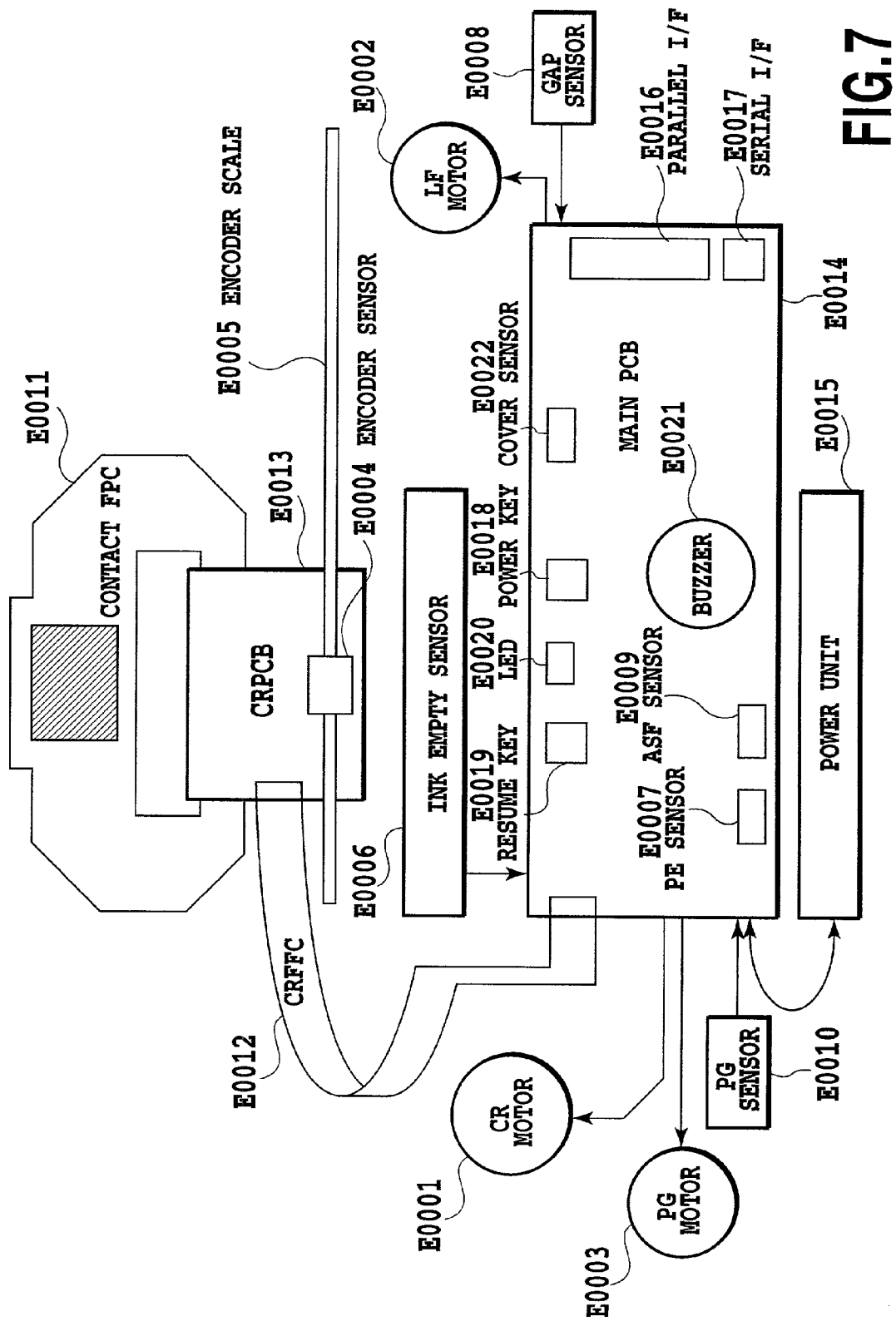
FIG. 7 is a block diagram schematically showing the overall configuration of an electric circuitry of the printer according to one embodiment of the present invention.

FIG. 7 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figure 8A:
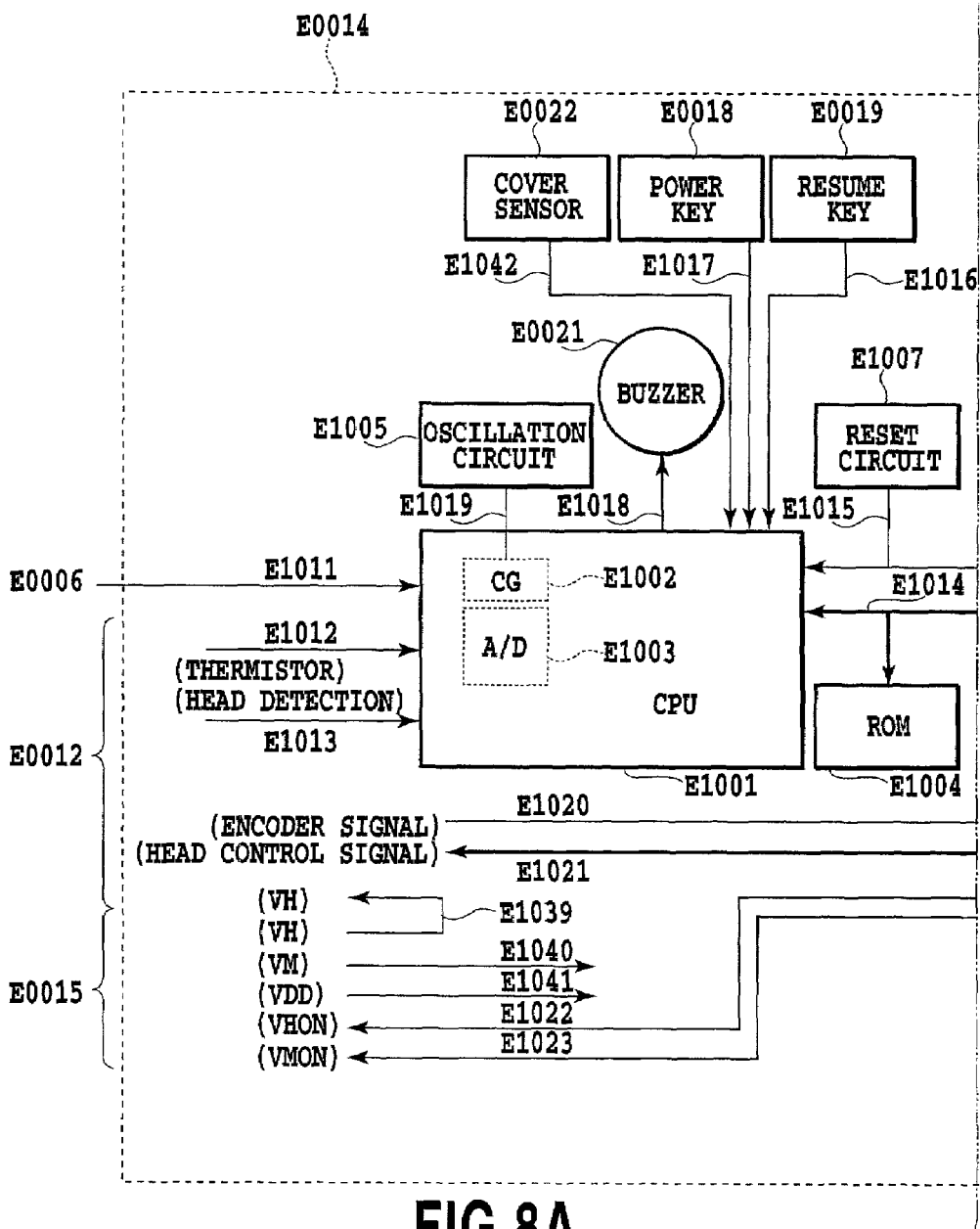
FIG. 8 is a diagram showing the relationship between FIGS. 8A and 8B, FIGS. 8A and 8B being block diagrams representing an example inner configuration of a main printed circuit board (PCB) in the electric circuitry of FIG. 7.
Figure 8B:
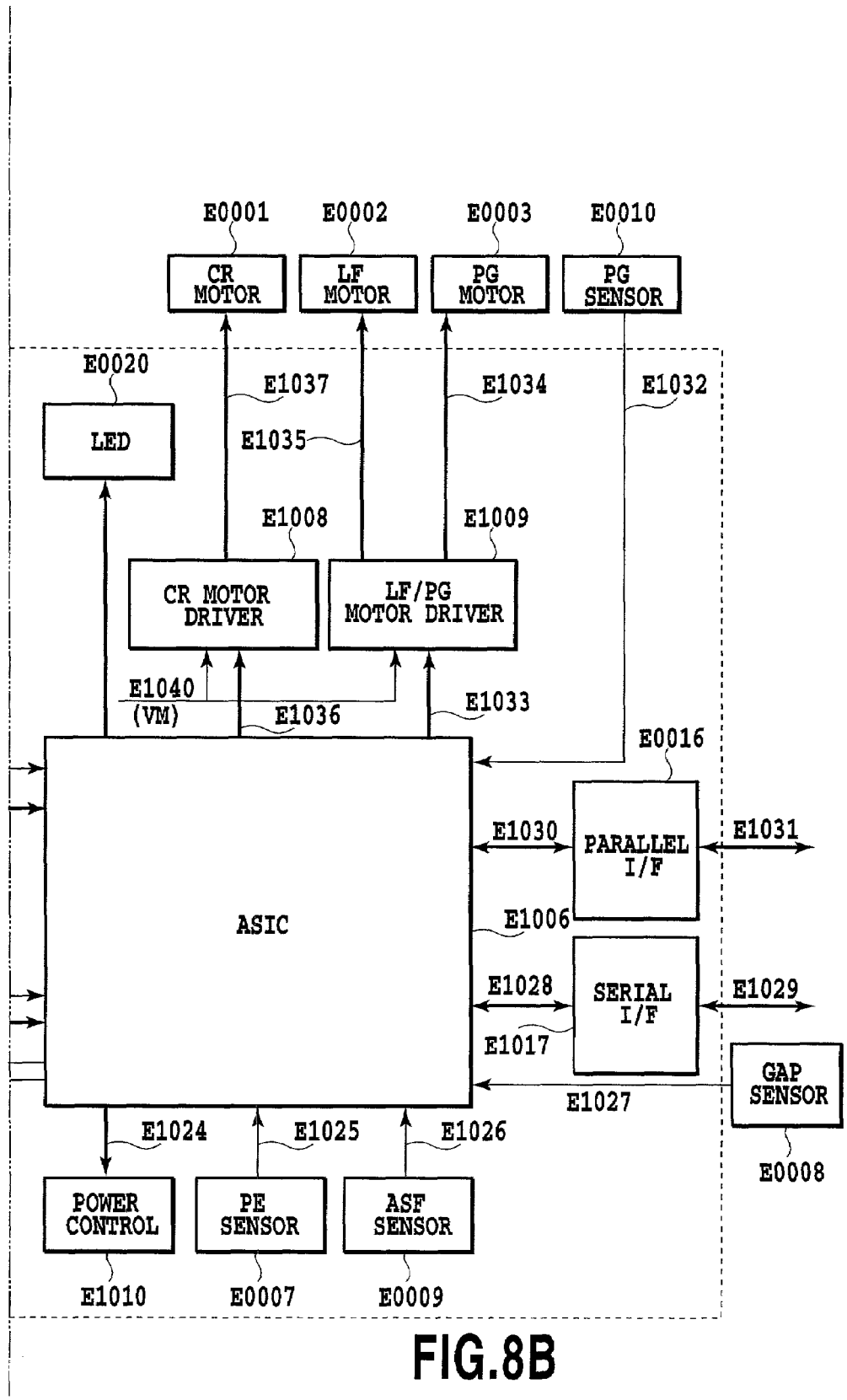

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor. The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000. E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASFS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
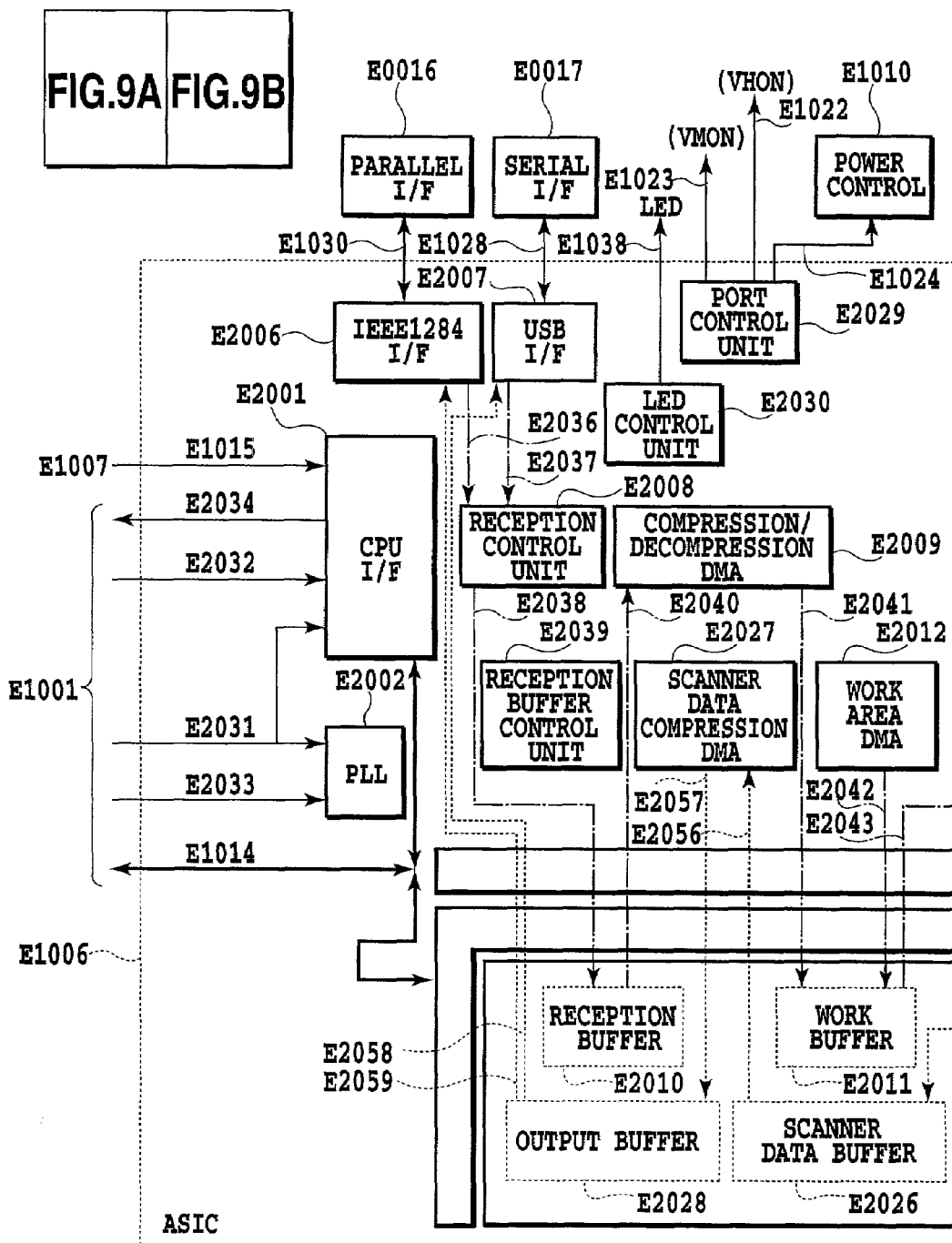
FIG. 9 is a diagram showing the relationship between FIGS. 9A and 9B, FIGS. 9A and 9B being block diagrams representing an example inner configuration of an application specific integrated circuit (ASIC) in the main PCB of FIGS. 8A and 8B.
Figure 9B:
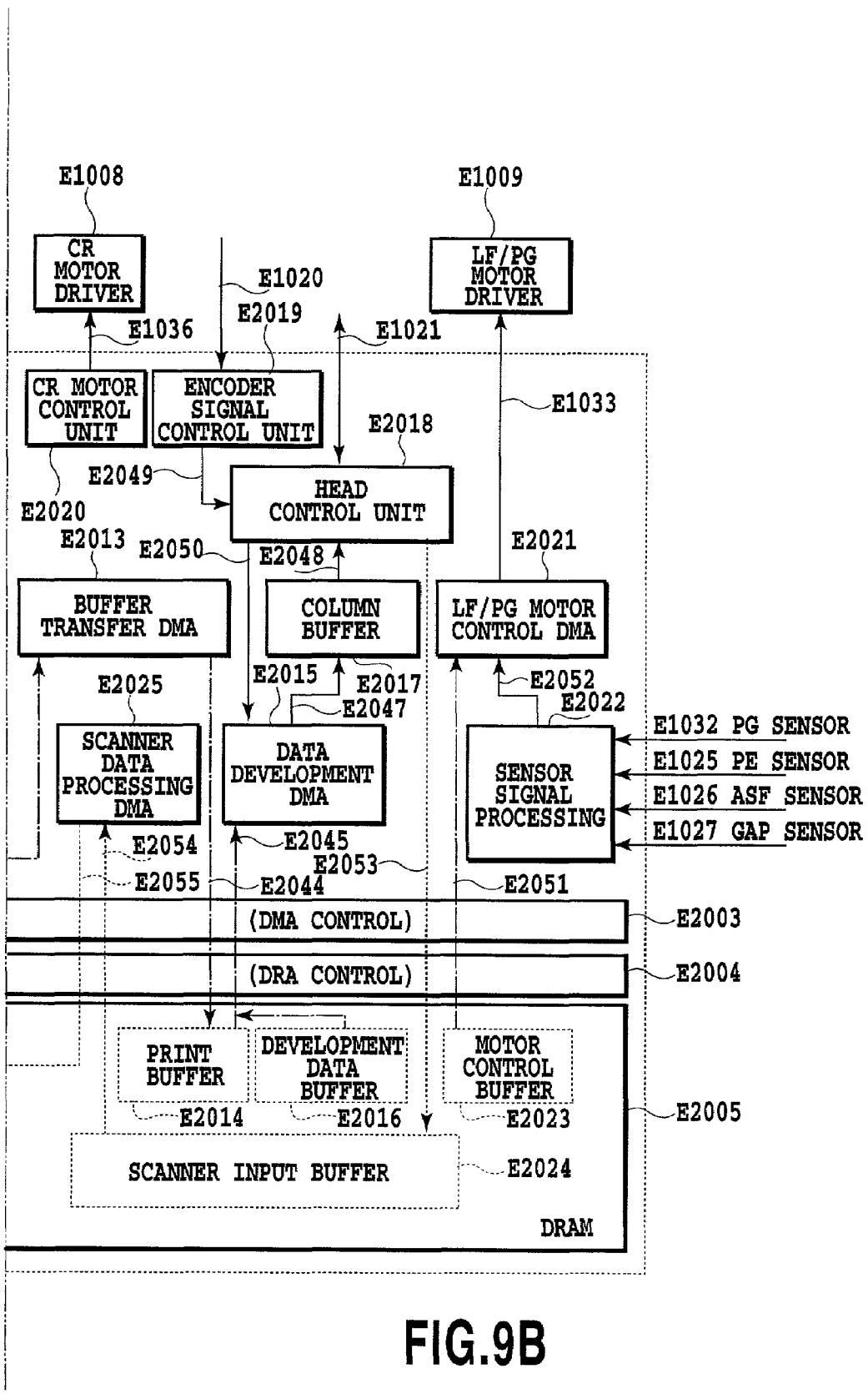

FIG. 9 is a diagram showing the relation between FIGS. 9A and 9B, and FIGS. 9A and 9B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control unit to make DRAM accesses. In the case of read operation, the DMA control unit E2003 transfers the read data E2040, E2043, E2045, E2051, E2054, E2056, E2058, E2059 from the DRAM control unit E2004 to the requesting blocks.

Denoted E2006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/FE2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021. In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers this sensor information to the CPU E001 according to the mode determined by the CPU E1001. The sensor signal processing unit E2022 also outputs a sensor detection signal E2052 to a DMA controller E2021 for controlling the LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

5. Operation of Printer

Figure 10:
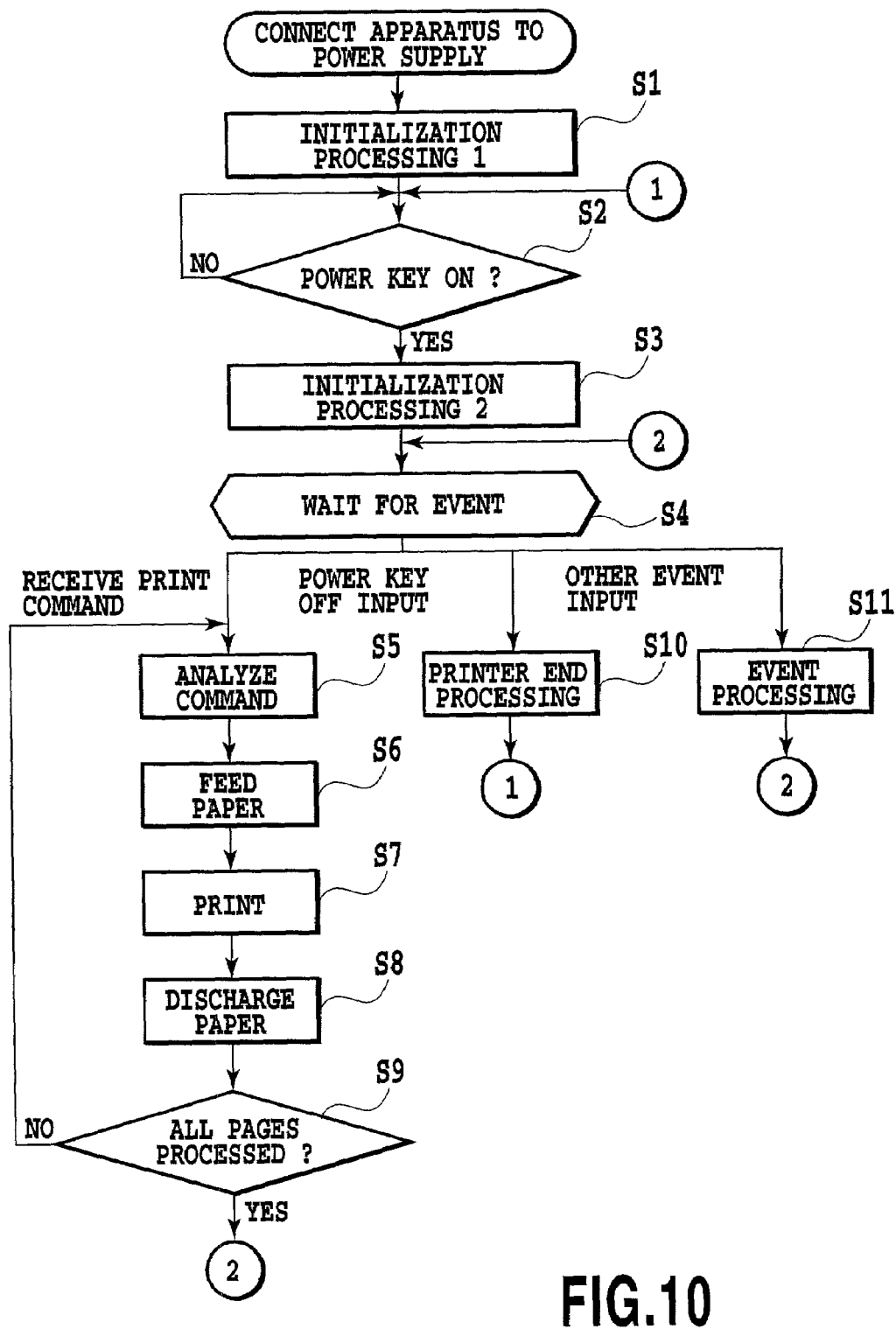
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, step S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

A form of application where the present invention can effectively be implemented is the ink jet print head in which thermal energy generated by an electrothermal transducer is used to cause film boiling in a liquid to form a bubble.

(First Embodiment)

Next, the first embodiment of the constituent characteristic of the present invention will be described. "Head structure and printing style"

Figure 11:
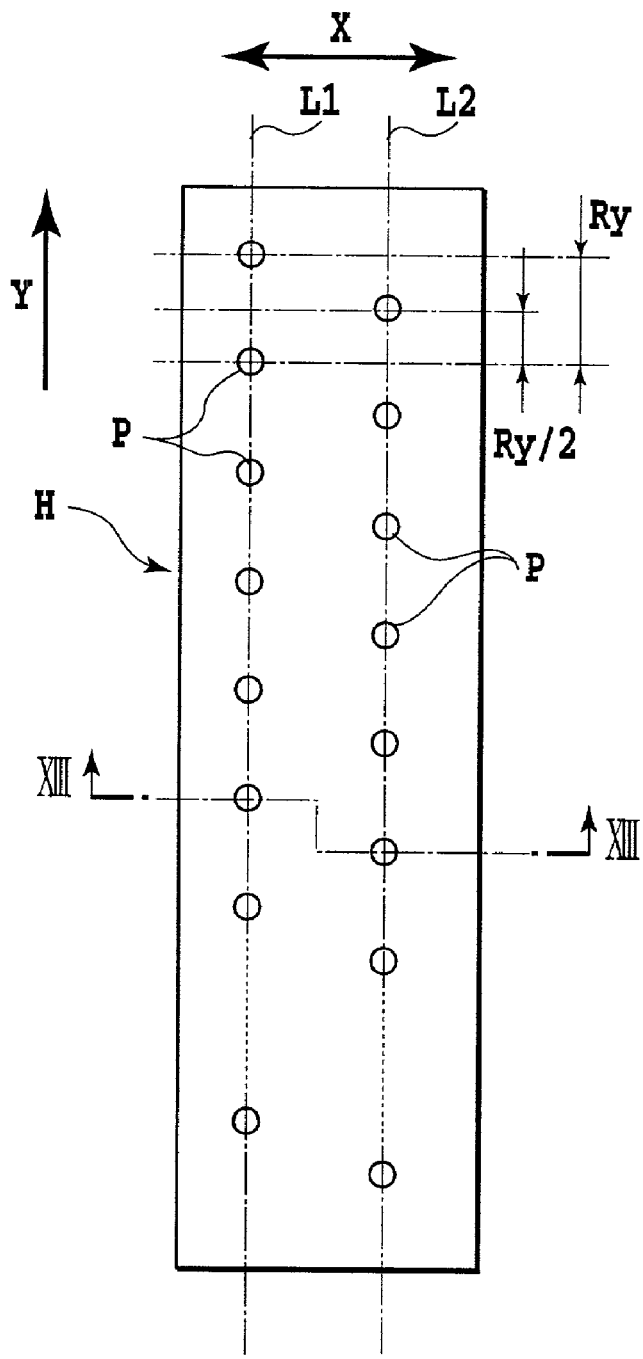
FIG. 11 is a schematic block diagram of a printing head used in a first embodiment of a constituent characteristic of the present invention, viewed from a nozzle side.
Figure 12:
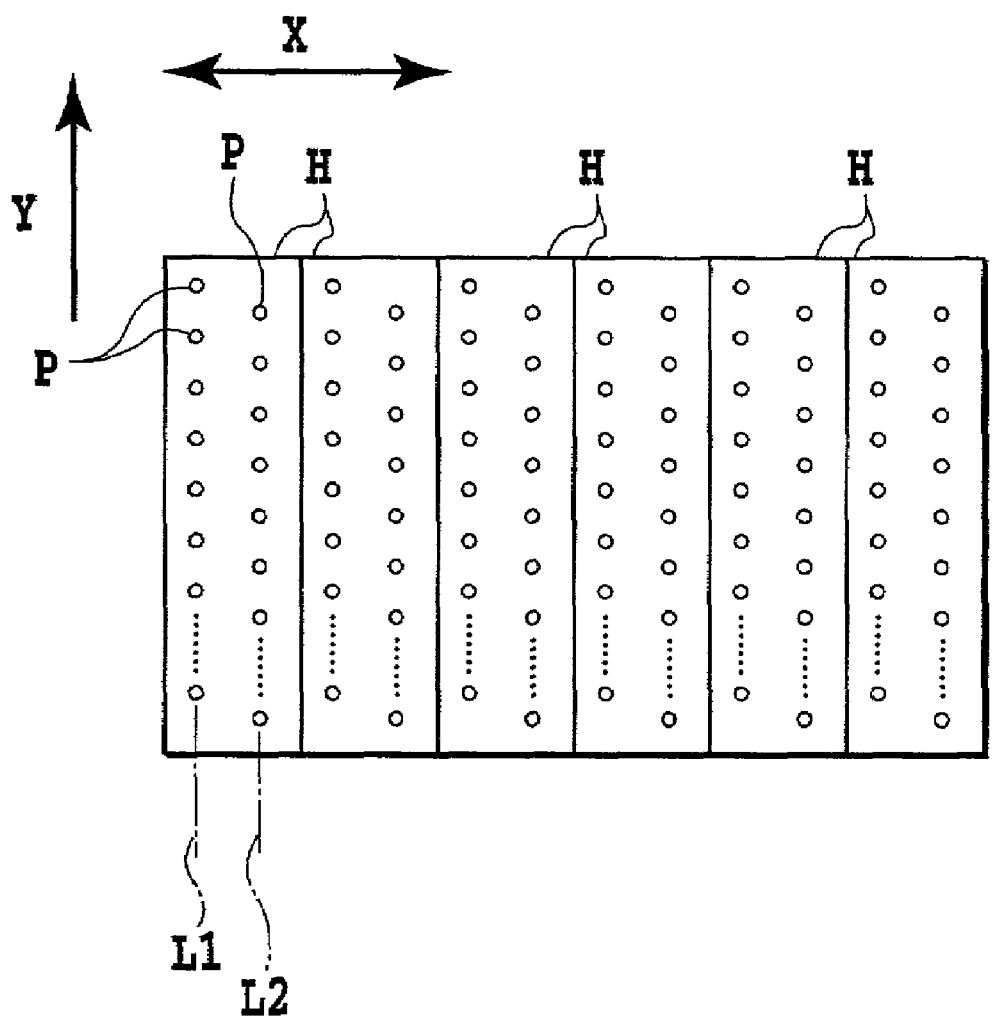
FIG. 12 is an explanatory drawing for a case using a plurality of heads similar to the head shown in FIG. 11.
Figure 13:
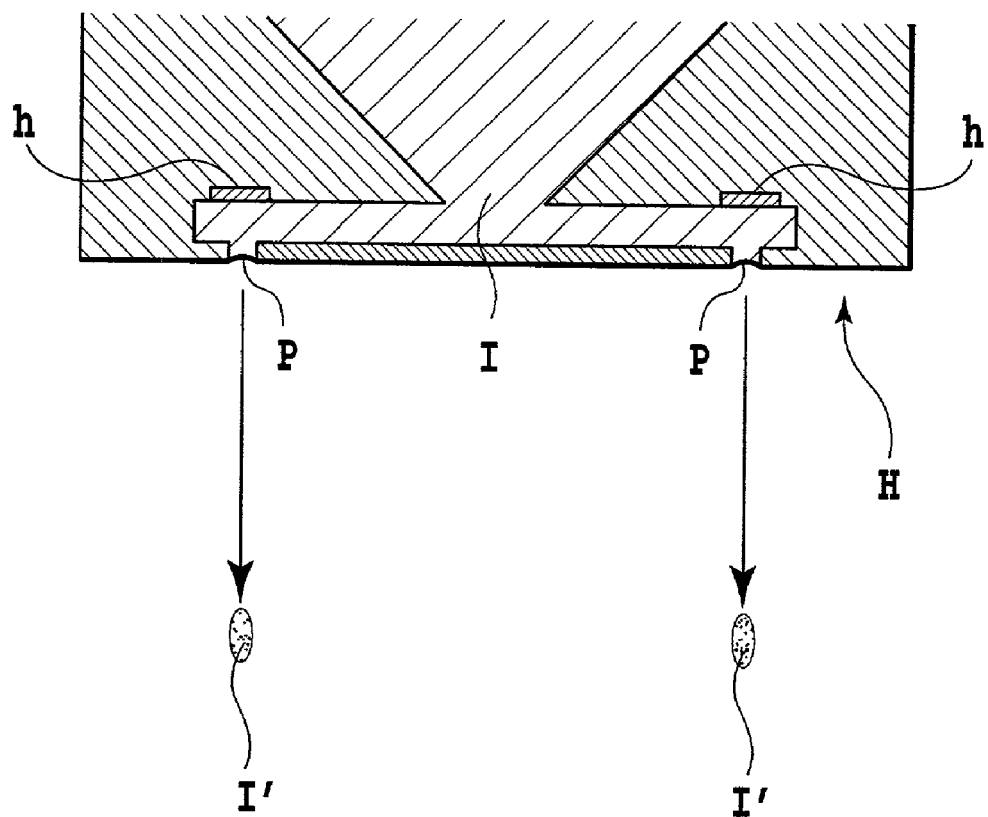
FIG. 13 is an enlarged cross-section of the printing head taken along section line XIII—XIII of FIG. 11.

In this embodiment, a printing head H with a structure as shown in FIGS. 11 to 13 is used as the printing head H1001 mounted on the carnage M4001. In the printing head H of this example, a plurality of ejection ports P each capable of ejecting the ink are arranged in two lines L1, L2 (hereinafter, also referred to as "nozzle rows"). The nozzle rows L1, L2 extend in a sub scanning direction indicated by an arrow Y along which the printing medium is transferred. 128 ejection ports P (for 128 nozzles) each constituting a nozzle in each nozzle row L1 (L2) are formed at regular intervals that correspond to 600 dpi as a pitch Py. Further, the ejection ports P in the nozzle row L1 and the ejection ports P in the nozzle row L2 are shifted from each other by a half pitch (Py/2) which corresponds to 1200 dpi in the sub scanning direction indicated by the arrow Y. An arrow X indicates a main scanning direction along which the printing head H makes reciprocating motion. Then, by making these 256 ejection ports P in the two rows eject inks of the same color, the image can be printed with a dot density in the sub scanning direction of 1200 dpi. Therefore, the printing resolution in the sub scanning direction becomes two times that of the case where only one nozzle row (one of the nozzle rows L1, L2) exists. Incidentally, in this example, because of a later-described reason, each dot that is formed by the ink ejected from the nozzle is controlled to have a diameter of 45 µm. A spacing that corresponds to 1200 dpi is 21.7 µm.

Moreover, in this example, the multi-path printing method is adopted, so that the pixels on the same raster are printed using a plurality of nozzles. For example, when an 8-pass unidirectional printing system or an 8-pass bi-directional printing system is adopted, the same raster is printed using 8 different nozzles while the printing head H makes 8 passes (scanning), and thereby an effect of turbulence in the image that may result from dispersion in ink ejecting directions of the respective nozzles etc. can be controlled to be small. Incidentally, in the case of the unidirectional printing system, the printing head H performs a printing operation only when it scans in one direction, whereas in the case of the bi-directional printing system, the printing head H performs a printing operation when it scans in both directions.

In addition, in the case of this example, as will be described later, the printing resolution in the main scanning direction is set to 2400 dpi, two times the basic printing density of 1200 dpi, and accordingly the printing resolution in the main scanning direction and the sub scanning direction are set to 2400 dpi×1200 dpi. Moreover, the half tone (half tone level) is printed by using the error diffusion method (ED).

Figure 22B:
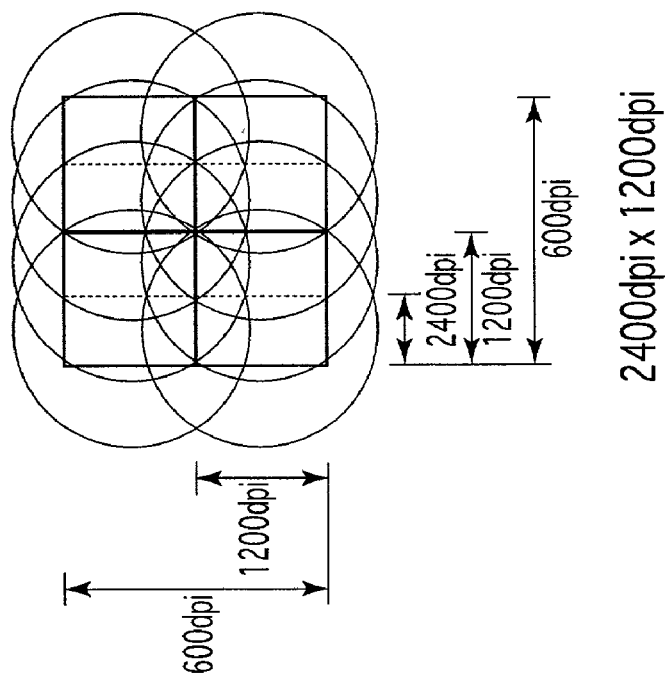
FIG. 22A and FIG. 22B are explanatory drawings of relationships between the pixel and the dot for different resolutions.
Figure 22A:
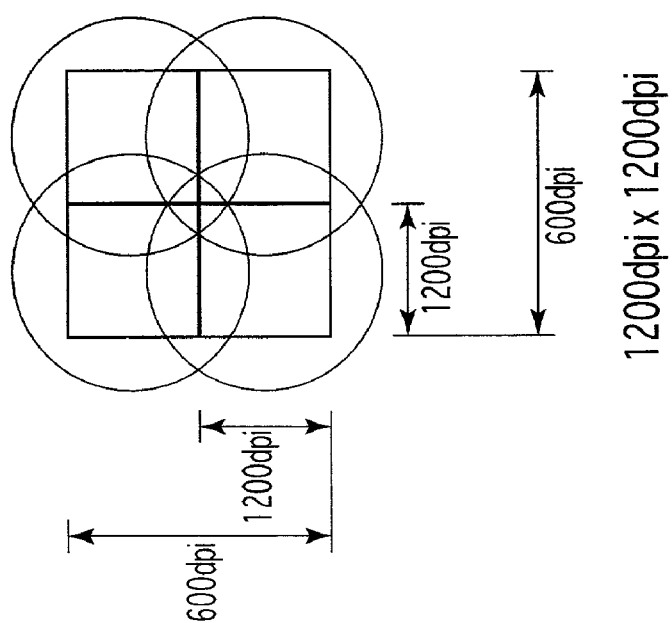

Note that, in the case of this example, the resolution of the image data to be inputted into the printing apparatus from the host device is 600 ppi×600 ppi. Here, ppi represents pixels per inch. To accommodate this resolution into a printing mode of 2400 dpi×1200 dpi, the printing apparatus performs gradation representation for each of 4×2 printing areas consisting of 4 pixels in the main scanning direction by 2 pixels in the sub scanning direction, as shown in FIG. 22B. In other words, the gradation representation is done in each unit scope (unit area) that corresponds to resolutions of 600 ppi×600 ppi. Incidentally, the number of steps that can be represented in each unit scope is set to 9 gradations, namely gradation levels 0 to 8. Moreover, in this example, the printing apparatus is provided with 6 printing heads H, as shown in FIG. 12, which eject inks of cyan (C), magenta (M), yellow (Y), and black (K) and also inks of light cyan (Lc) and light magenta (Lm), respectively. Here, the inks of cyan (C), magenta (M), yellow (Y), and black (K) are dark inks each containing a relatively high concentration of a dye, while the inks of light cyan (Lc) and light magenta (Lm) are light inks each containing a relatively low concentration of a dye, the concentrations being ⅙ those of the dark inks. Thus, different inks are ejected from the respective printing heads, each consisting of the two nozzle rows L1, L2, whereby a color image is printed. When a printing mode of 1200 dpi×1200 dpi is accommodated, the gradation representation is performed for each 2×2 printing area consisting of 2 pixels in the main scanning direction by 2 pixels in the sub scanning direction (a unit scope that corresponds to resolutions of 600 ppi×600 ppi), as shown in FIG. 22A.

In FIG. 13, the reference character h denotes a heater (electrothermal converter), which generates thermal energy that is to be used as energy whereby the ink droplet I' is ejected in response to a driving signal. With the thermal energy by the heater h, film boiling is generated in the ink inside the nozzle and foaming energy at that occasion ejects the ink droplet I' from the ejection port P.

"Relation Between Applying Amount and Density"

Next, a relation between the applying amount of the ink that is ejected for applying on the printing medium to form a dot and the printing density will be described referring to FIG. 14.

Here, the applying amount of ink is an index that measures how much ink is ejected for applying to form one pixel in terms of the percentage (or equivalent number of the above-defined dots), where a unit scope that corresponds to resolutions of 1200 dpi×1200 dpi is defined as one pixel and the ink applying amount wherewith one dot as large as covers the said one pixel sufficiently is formed for one pixel is defined as 100%. Therefore, the ink applying amount when 2 dots are formed for one pixel measures 200%, and the ink applying amount when 3 dots are formed for one pixel measures 300%. As is obvious from the foregoing, in FIG. 22A, since one dot is formed for each unit scope of 1200 dpi×1200 dpi, the applying amount is 100%; in FIG. 22B, since two dots are formed for each unit scope of 1200 dpi×1200 dpi, the applying amount is 200%.

Note that how to define the applying amount is not limited to this example, and it may be defined as follows. That is, the applying amount of the case where the dots necessary and sufficient to cover the unit scope that corresponds to resolutions of 600 dpi×600 dpi are formed, as shown in FIG. 22A, may be defined as an applying amount of 100%. Concretely, the applying amount of the case when 4 dots are formed in the unit scope that corresponds to resolutions of 600 dpi×600 dpi as in FIG. 22A is defined as 100%; the applying amount of the case when 8 dots are formed in the unit scope that corresponds to resolutions of 600 dpi×600 dpi as in FIG. 22B is defined as 200%. Therefore, when 5 dots are formed in a unit scope that corresponds to resolutions of 600 dpi×600 dpi, the applying amount becomes 125%; when 7 dots are formed in the said unit scope, the applying amount becomes 175%.

Thus, in this description, with regard to the "applying amount", when a certain number of the dots necessary to cover a specified unit scope (unit area), such as a unit scope that corresponds to resolutions of 1200 dpi×1200 dpi and a unit scope that corresponds to resolutions of 600 dpi×600 dpi, are formed in the said unit scope, applying amount equivalent to that number of the dots (N) is defined as an applying amount of 100%. Therefore, when 2N dots are formed in a specified unit scope (unit area) previously specified, the applying amount becomes 200%; when 1.75N dots are formed in a specified unit scope (unit area) previously specified, the applying amount becomes 175%.

Figure 14:
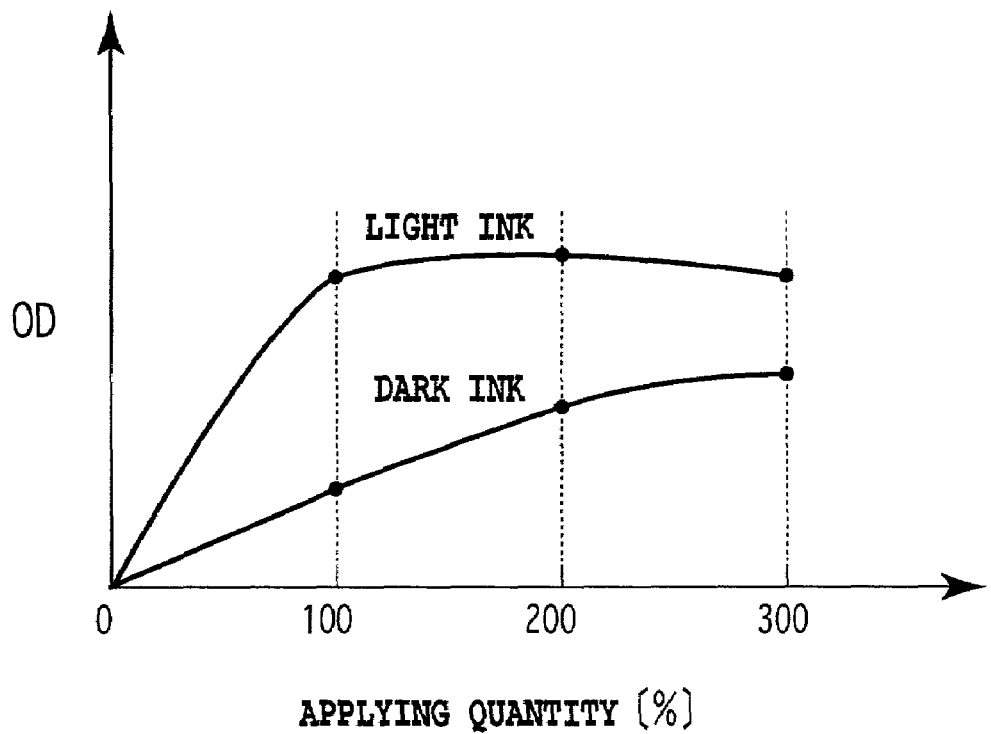
FIG. 14 is an explanatory drawing of a relationship between the applying amount of the dark ink and of the light ink and reflection density.

As shown in FIG. 14, regarding the dark ink, for ink applying amounts from 0 to 100%, the density goes up almost in proportion. However, when the applying amount exceeds 125%, the density hardly goes up at all. Further, when the applying amount increases up to 200% or beyond, no density increment is observed but inverse density decrement is observed and deterioration in the image quality due to overflow of the ink occurs. Therefore, it is found that, regarding the total applying amount of the ink in printing the secondary colors, the tertiary colors, and more, even if the ink is forcibly ejected for applying to a degree equal to 125% or more, little merit can be obtained in terms of the image quality.

On the other hand, regarding the light ink, for the ink applying amounts from 0 to 200%, the density goes up effectively almost in proportion. Further, when the applying amount is increased up to 300%, the density itself hardly goes up at all, and in the worst case, the ink may overflow from the printing medium to effect deterioration in the image quality. In consideration of this, it can be said then that usage of the light ink brings about the density enhancement and excellent gradation characteristics as long as the light ink is used in a range from 0% to just below 300%, which exceeds 200%, as compared to the case with the light ink being used at 100%.

In this embodiment, the ink applying amounts of the dark ink and of the light ink per specified unit area that are specified previously are decided using a look-up table (LUT).

Figure 15:
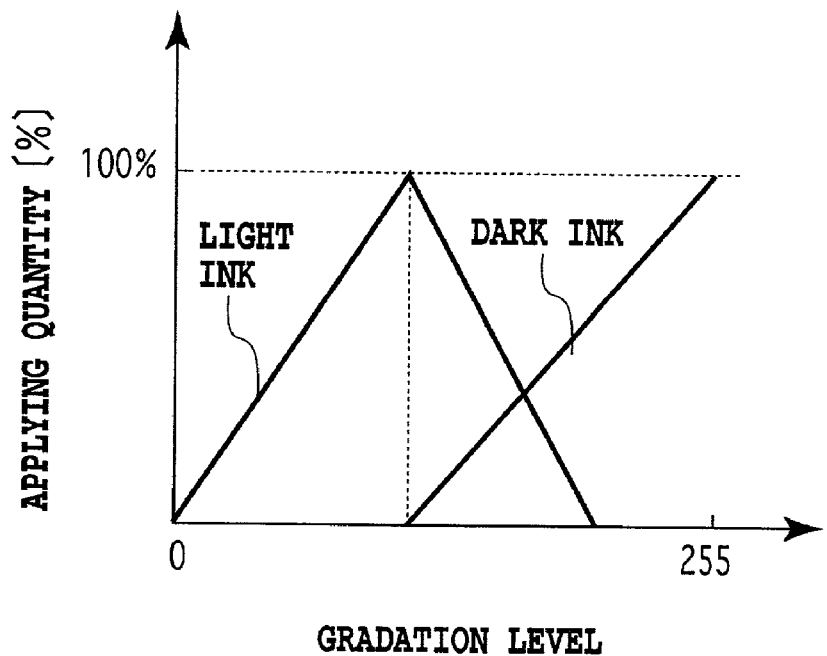
FIG. 15 is an explanatory drawing of a relationship between the gradation level (density level) and the applying amount of the dark ink and of the light ink in the prior art.

FIG. 15 is an explanatory drawing of the conventional LUT. This LUT specifies that the applying amount of the light ink is gradually increased according to the input gradation level (density level of the input image data) and, after the applying amount reaches a peak locating in a range from 100 to 130%, the applying amount is gradually decreased as the input gradation level further increases. Moreover, the LUT specifies that the applying of the dark ink is started at a critical input gradation level at which the light ink is applied to its maximum amount and the applying amount of the dark ink is gradually increased as the input gradation level increases, reaching its maximum when the input gradation level comes to the maximum.

Figure 16:
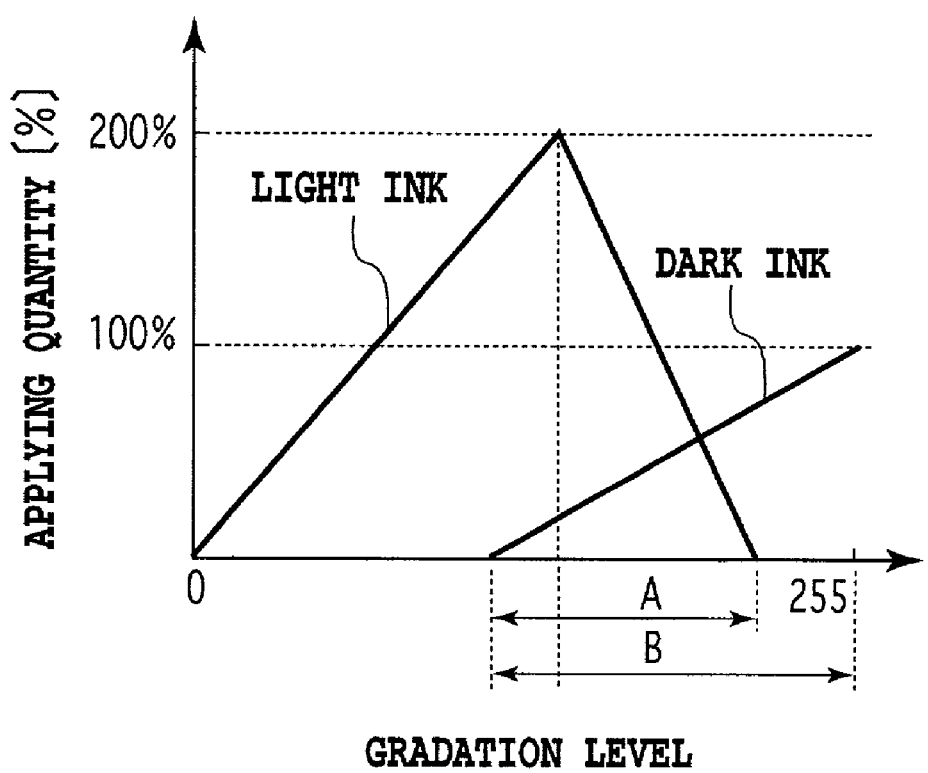
FIG. 16 is an explanatory drawing of a relationship between the gradation level (density level) and the applying amount of the dark ink and of the light ink in the first embodiment of a constituent characteristic of the present invention.
Figure 18:
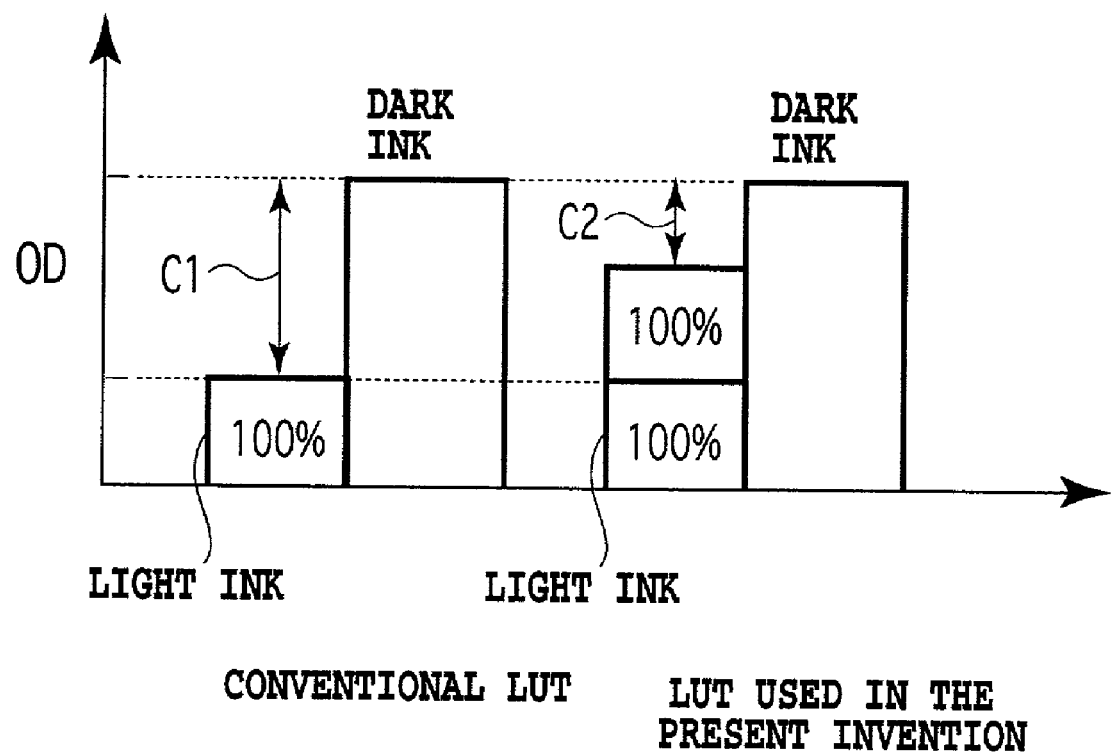
FIG. 18 is an explanatory drawing of contrast difference between the dark ink and the light ink in FIG. 15 and FIG. 16.

FIG. 16 is an explanatory drawing of a LUT used in this embodiment. In this LUT, the maximum applying amount of the light ink is set to 200% (a first peak). Because of this setting, the input gradation level when the light ink is ejected to its maximum is shifted upward and the dot density at the time is increased as compared to the case where the conventional LUT of FIG. 15 is used. Therefore, the input gradation level when the applying of the dark ink is started is shifted upward. As a result, in the case where the applying amount of the light ink is chosen to the maximum quantity of 200%, at the time when the applying of the dark ink is started, a difference (contrast) between the density formed by the applying of the light ink to 200% and the density of the dark ink becomes a relatively small value C2, as shown by the right bar graph in FIG. 18. Therefore, in the medium-density range at which the applying of the dark ink is started, the dot can be made less noticeable and the granularity is reduced. Contrary to this, in the case where the conventional LUT of FIG. 15 is used and when the applying amount of the light ink is chosen to a maximum of 100%, the difference (contrast) between the density formed by the applying of the light ink to 100% and the density of the dark ink becomes a relatively large value, C1 (C1>C2), as shown by the left bar graph in FIG. 18. Therefore, in the medium-density range at which the applying of the dark ink is started, the dot becomes noticeable and the granularity is increased.

In addition, when the LUT of FIG. 16 is used, since the input gradation level at which the applying of the dark ink is started is increased, a slope of variation in the applying amount of the dark ink versus the input gradation level becomes larger than that for the case with the conventional LUT of FIG. 15 used. Therefore, as shown in FIG. 16, the medium-density range from the applying of the dark ink is started, namely, a density range A (a width of the gradation levels) in which the granularity tends to appear can be narrowed, and a density range B (a width of the gradation levels) in which the dark ink is ejected for applying can also be narrowed. Consequently, as compared to the case where the conventional LUT of FIG. 15 is used, a high-quality image with reduced granularity can be printed for the entire density range. Incidentally, the maximum applying amount of the dark ink is set to 100% (a second peak) in FIG. 16.

Thus, in this embodiment, when deciding the formation volumes of the light dot (low-density dot) and of the dark dot (high-density dot) for a specified unit area, the LUT as shown in FIG. 16 is used. The LUT specifies that for the light ink whose density increases linearly at least up to 200%, the maximum applying amount is set to 200% (the first peak), and for the dark ink whose density increases linearly up to an applying amount of 100%, the maximum applying amount is set to 100% (the second peak). With this setting, a width of the gradation levels (density levels) where the gradation is formed only with the light ink, whose granularity is hard to notice, can be widened, while a width of the gradation levels (density levels) where the gradation is formed with the dark ink, whose granularity is relatively easy to notice, can be narrowed; therefore, the granularity of an image as a whole can be reduced.

Note that, in this invention, it is preferable that the predetermined gradation level at which the applying of the dark ink is started is, as shown in FIG. 16, a gradation level lower than the gradation level that corresponds to the case where the light ink is ejected for applying to its maximum quantity. That is, it is preferable that the applying of the dark ink is started before the applying amount of the light ink reaches the first peak (200%). However, if the gradation level at which the applying of the dark ink is started is too low, in other words, if the applying of the dark ink is started at a time when the applying amount of the light ink is low, reduction in the granularity cannot be achieved. Therefore, it is preferable that the predetermined gradation level at which the dark ink starts to eject is set to the gradation level at which the applying amount of the light ink reaches at least 175%. In the case where the applying of the dark ink is started at a gradation level where the applying amount of the light ink is equal to 175% or more, since the width of the density range that is formed only with the light ink is widened and the density range where the dark dots, whose granularity is easy to notice, are formed is narrowed, the granularity is reduced as a whole as compared to the conventional case. Thus, the predetermined gradation level at which the applying of the dark ink is started is set to a gradation level lower than the gradation level at which the applying amount of the light ink becomes a maximum, whereby color mixing at a boundary density level where the printing with the light dot is gradually connected to the printing with the dark dot can be performed in an extremely smooth manner, and hence the quality of the printed image can be highly improved.

Figure 17:
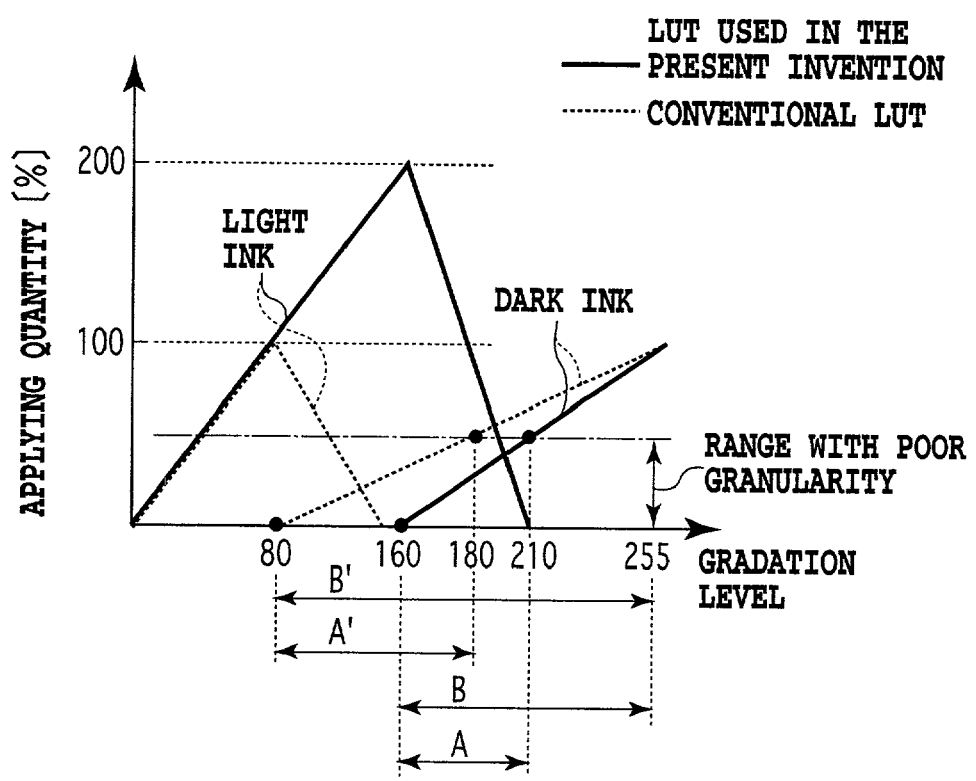
FIG. 17 is an explanatory drawing of a concrete example of comparison between the conventional LUT and a LUT used in the present invention.

FIG. 17 is a view comparing the conventional LUT and the LUT used in this invention. Specifically, this is a view in which the density range A (the medium-density range at which the applying of the dark ink is started, namely, a density range where the granularity becomes noticeable) and the density range B (the density range where the dark ink is ejected for applying) are compared with the corresponding density ranges A' and B' that are obtained with the conventional LUT. In this example, widths of the gradation level that corresponds to regions A, A', B, and B' become A=50, A'=100, B=95, and B'=175, respectively, and A<A' and B<B'. Being obvious from this, in the present invention, a density range B (a width of the gradation levels) where the dark ink is ejected for applying is narrowed, and also a density range A (a width of the gradation levels) where the granularity is easy to notice is narrowed, whereby the granularity of the dot is reduced.

Incidentally, the LUT used in this embodiment may be such a table for prescribing that the applying of the dark ink should be started before the applying amount of the light ink reaches the first peak (200%) as shown in FIG. 16 or such a table for prescribing that the applying of the dark ink should be started when the applying amount of the light ink reaches the first peak (200%) as shown in FIG. 17. Thus, in this embodiment, the predetermined gradation level (density level) at which the applying of the dark ink is started may be advantageously set to a density level equal to or just below the density level that corresponds to the first peak, or to a density level above the density level that corresponds to the first peak. In a word, the predetermined gradation level (density level) at which the applying of the dark ink is started may preferably be set to a density level higher than the predetermined density level at which the formation amount of the low-density dot reaches a prescribed amount.

"Relation Between Pixel and Dot"

Figure 19:
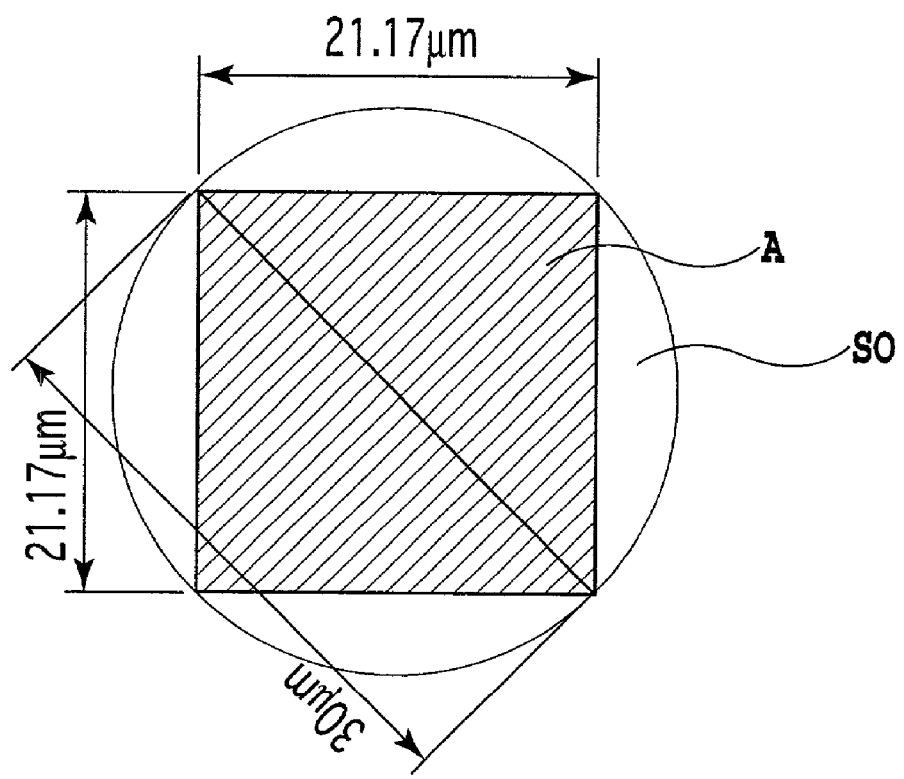
FIG. 19 is an explanatory drawing of a relationship between the pixel and the dot.

When the printing resolution is 1200 dpi×1200 dpi, an area A per pixel becomes 448 $\mu m^2$ as shown in FIG. 19. Accordingly, the minimum dot diameter required to cover the one pixel is 30 µm, the distance of the diagonal of one pixel, and the dot area SO measures 706.5 $\mu m^2$. This value corresponds to approximately 1.5 times (158%) the area of one pixel, or more. However, it is necessary, in practice, to add about 10 µm as a margin for mechanical errors of the printer (such as ink applying accuracy of the printing head and sheet feed error). Therefore, the optimal dot diameter becomes 40 µm. The area of the dot becomes 1257 $\mu m^2$, which is approximately 2.8 times the area A per pixel. Thus, in high-resolution printers whose printing resolution is equal to 1200 dpi×1200 dpi or more, the dot diameter should be decided so that the dot area is 2.0 or more times the area of the unit pixel to secure the required resolution. In cases with dot diameters that do not satisfy such conditions, banding (density evenness in the main scanning direction) tends to occur due to disturbance in the dot applying accuracy, the sheet feed error, movement error of the carriage because the area factor is not sufficient.

Figure 21:
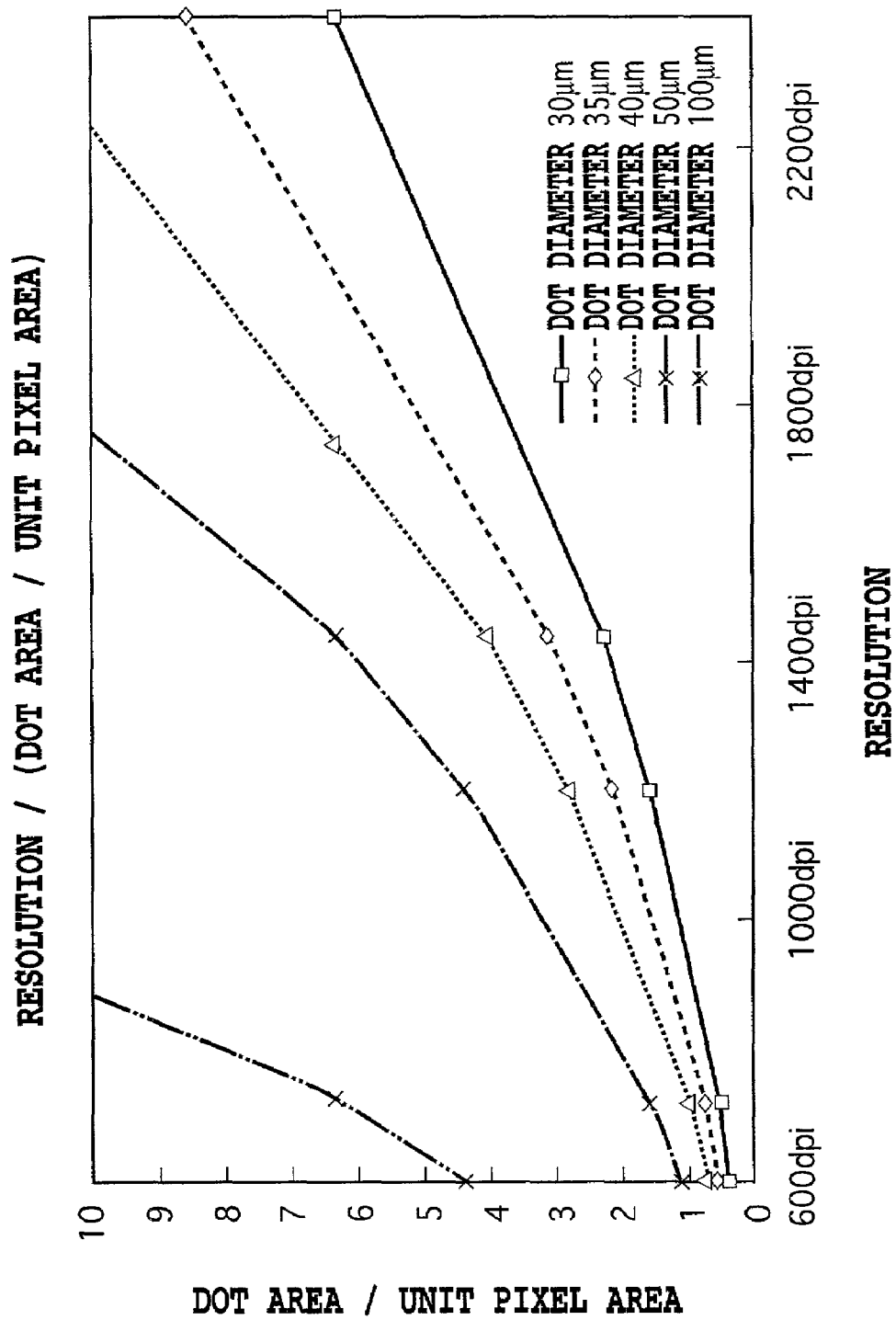
FIG. 21 is an explanatory drawing of a relationship between the resolution and the dot area per unit pixel area.

FIG. 20 and FIG. 21 are views showing a relation between unit pixel area that corresponds to the resolution and the dot area that corresponds to the dot diameter. In this embodiment, the dot diameter is set to 45 µm so that one pixel in the resolution of 1200 dpi×1200 dpi shown in FIG. 22A is covered by one dot sufficiently. Incidentally, from the area factor, optimal resolutions for a dot diameter of 45 µm are considered to be 1200 dpi×1200 dpi. In that case, the ink applying amount per pixel becomes 100%.

However, in this embodiment, it is necessary to raise the maximum ink applying amount of the light ink up to 200% in order to lessen the granularity, especially in the medium-density area, as described above. Therefore, in this embodiment, by setting the resolution in the main scanning direction to 2400 dpi, twice 1200 dpi, as in FIG. 22B, the dot applying amount per unit area in the main scanning direction (the area of one pixel in resolutions of 1200 dpi×1200 dpi) was doubled accordingly. Therefore, when each of 8 pixels of a 4×2 arrangement is applied with one dot in resolutions of 2400 dpi×1200 dpi, the ink applying amount per pixel in resolutions of 1200 dpi×1200 dpi becomes 200%. Then, in this case, a dot area of 1590 $\mu m^2$ for a dot diameter of 45 µm becomes approximately seven times one pixel area of 224 $\mu m^2$ in resolutions of 2400 dpi×1200 dpi.

"Method of Processing Input Image Data"

Figure 23:
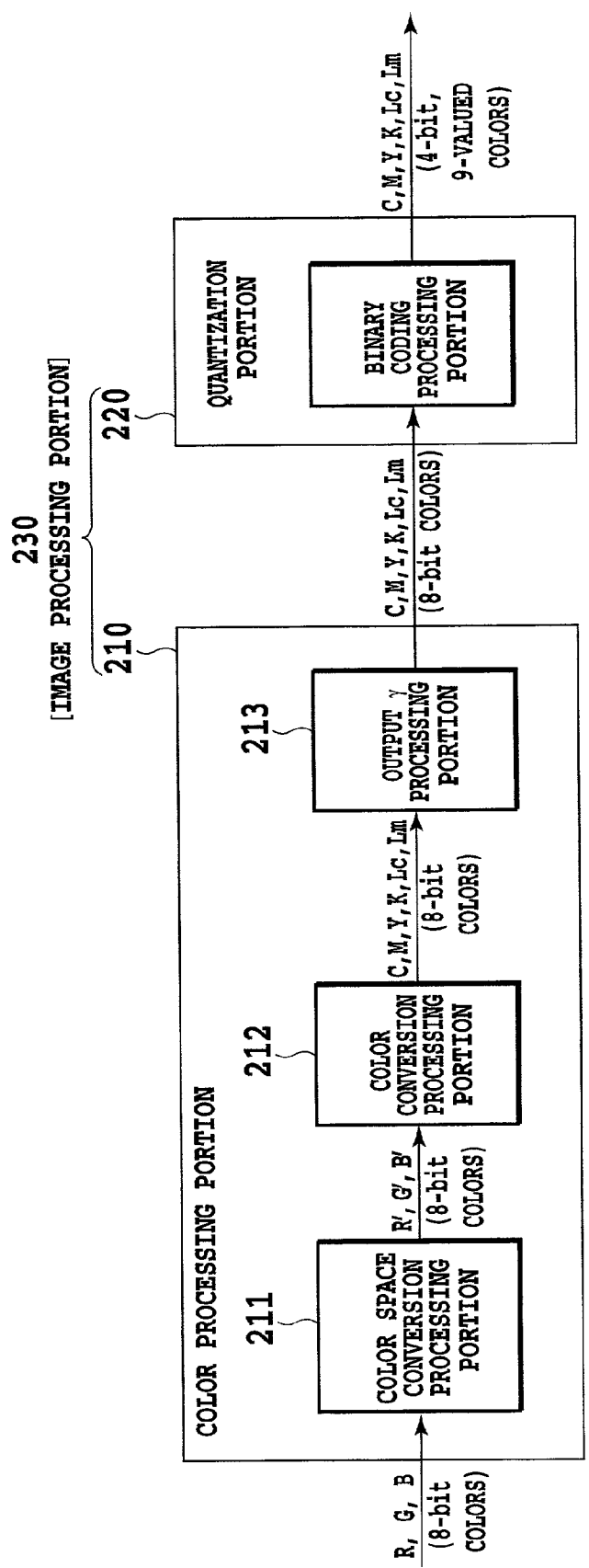
FIG. 23 is a block diagram of an image data processing portion in the first embodiment of a constituent characteristic of the present invention.

FIG. 23 is a functional block diagram illustrating a function of an image processing portion 230 for processing the input image data. This image processing portion 230 consists of a color processing portion 210 and a quantization portion 220, and is for outputting the inputted image data consisting of R, G, and B colors each having 8 bits (256 gradations) into data consisting of C, M, Y, K, Lc, and Lm colors each having 4 bits. Further, the color processing portion 210 has a structure comprising a color space conversion processing portion 211, a color conversion processing portion 212, and an output γ processing portion 213.

In the image processing portion 230 configured as such, first, 8-bit data of each of R, G, and B colors inputted from an external host apparatus are converted into 8-bit data of R', G' and B' colors by a three-dimensional LUT in the color space conversion processing portion 211. This processing is also referred to as pre-stage color processing where processing of conversion for compensating a difference between a color space of the input image and a reproduced color space of an output device is performed.

Next, the 8-bit data of R', G', and B' colors that have undergone the pre-stage color processing are converted into 8-bit data of C, M, Y, and K colors by the three-dimensional LUT of the color conversion portion 212. This processing is also referred to as post color processing where colors of the RGB system of the input system are converted into colors of the CMYK system of an output system. Further, data of each of C (cyan) and M (magenta) is separated into data for the dark ink and data for the light ink, respectively. In this separation, the data for C (dark cyan) and the data for Lc (light cyan) are separated so that ink applying amounts of the dark ink and of the light ink satisfy the relation of FIG. 16 or FIG. 17 described above. Similarly, data for M (dark magenta) and data for Lm (light magenta) are separated so that ink applying amounts of the dark ink and of the light ink satisfy the relation of FIG. 16 or FIG. 17 described above. Specifically, the LUTs of FIG. 16 and FIG. 17 determine the dark and light ink applying amounts for each specified unit area (unit scope that corresponds to resolutions of 600 dpi×600 dpi) consisting of 8 pixels (4×2) in FIG. 22B that was previously determined. Therefore, each of the horizontal axes of the LUTs of FIG. 16 and FIG. 17 denotes a value obtained by averaging input gradation levels for the 8 pixels (4×2) contained in the specified unit area.

Figure 24:
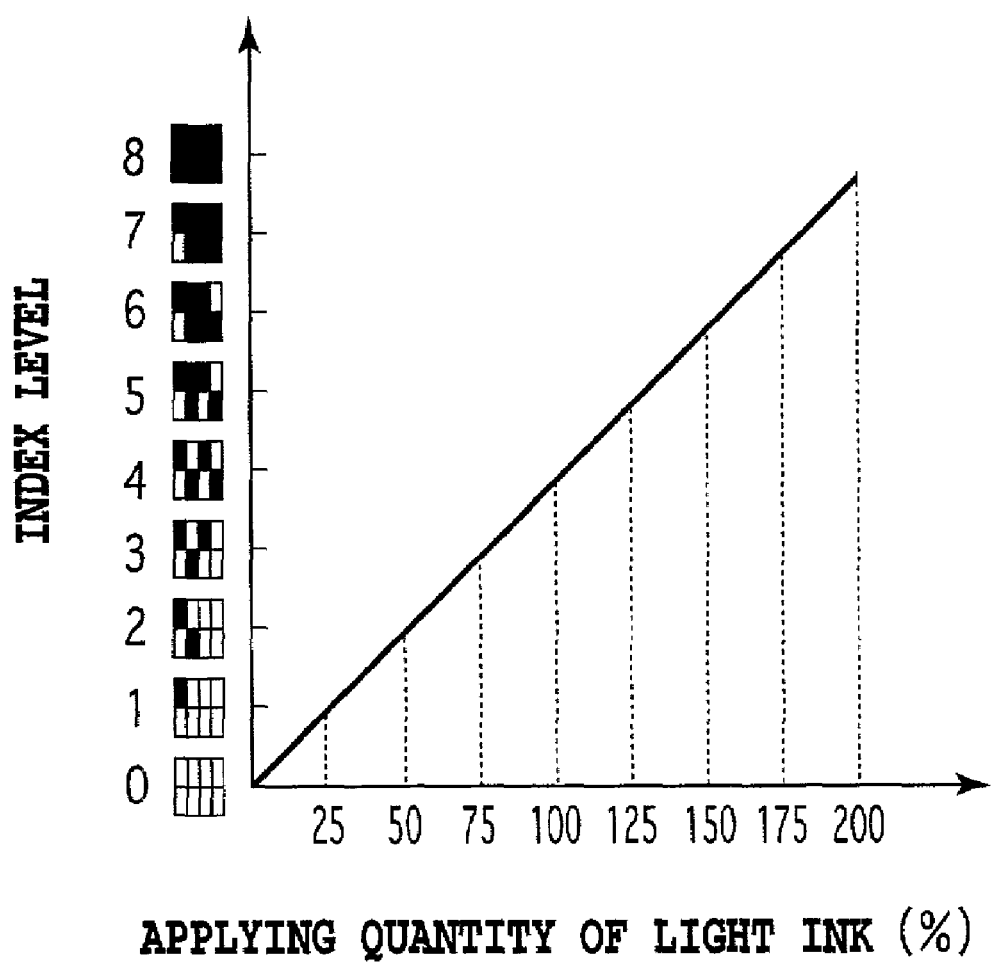
FIG. 24 is an explanatory drawing of an index pattern for the light ink that is used in the image data processing portion of FIG. 23.

The 8-bit data of C, M, Y, K, Lc, and Lm colors that have undergone the post color processing are output corrected by a one-dimensional LUT of the output γ processing portion 213, and subsequently binary coded by a quantization processing portion 221. Incidentally, in the case of this embodiment, a relation between the applying amount of the light ink for a unit area and the index pattern demonstrating the arrangement of the light dots is shown in FIG. 24. That is, as the applying amount of the light ink is increased from 0% to 200%, the number of dots that are formed in the unit area is increased from 0 to 8. Specifically, the index patterns showing 9 levels consisting of levels 0 to 8 in FIG. 24 correspond to 9 gradation levels in the case where 0–8 dots are formed in the 8 pixels (4×2) of FIG. 22B.

Figure 26:
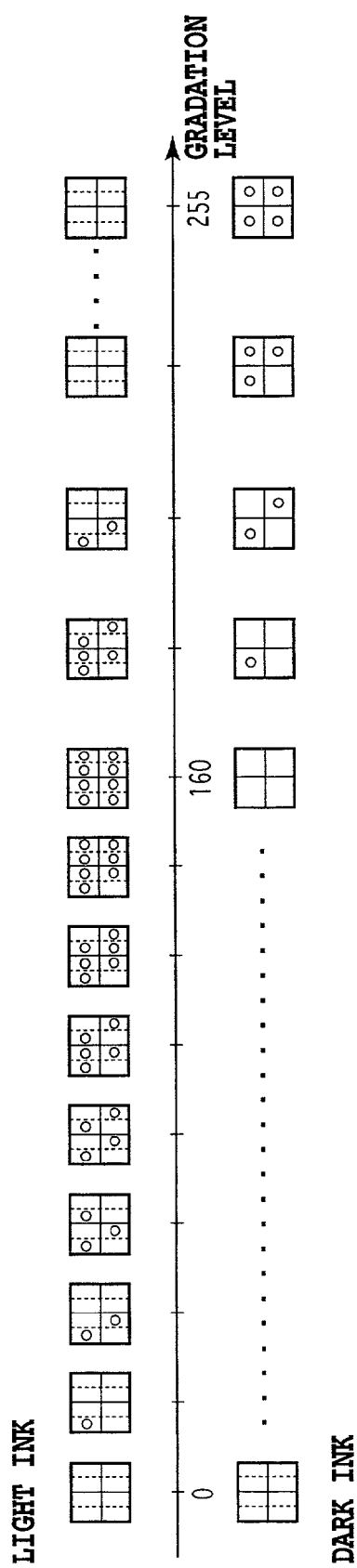
FIG. 26 is a explanatory drawing of a relationship between the gradation level (density level) and the index pattern of the dark dot and of the light dot.

FIG. 26 is a diagram showing a relation between the gradation levels (density levels) and the index pattern of the dark and light dots. The gradation levels shown in this FIG. 26 correspond to the gradation levels in the LUT according to the present invention shown in FIG. 17, and the gradation levels are converted into the index patterns of FIG. 26 based on this LUT. As is obvious from FIG. 26, regarding the light ink, (1) in a range of gradation levels (density levels) from 0 to 160, as the gradation level rises, the number of light dots (formed by light ink) to be formed in a specified unit area is gradually increased from 0 to 8, and (2) in a range of gradation levels (160 to 255) higher than the gradation level 160 at which the formation amount per unit area reaches the first peak (8 dots), as the gradation level rises, the number of light dots to be formed in the specified unit area is gradually decreased from 8 to 0. Regarding the dark ink, on and after the gradation level 160 that corresponds to the first peak at which the formation amount of dark dots (formed by dark ink) becomes the maximum, the number of the dark dots is made to increase, and more specifically, the number of the dark dots that are formed for the specified unit area is gradually increased from 0 to 4 in a range of the gradation levels ranging from 160 to 255. Thus, when each gradation level is converted to the index pattern in accordance with the LUT of the present invention, the maximum number of formation of the light dots (8 dots) that are formed for the specified unit area becomes twice the maximum number of formation of the dark dots (4 dots) that are formed for the specified unit area. Incidentally, as is clear from consideration of FIG. 17, in FIG. 26, when 4 dots are formed in the unit area, the applying amount reaches 100%; when 8 dots are formed in the unit area, the applying amount reaches 200%.

Note that, in the above example, the case where the applying amount of the light ink was set to 200% was described, but the applying amount of the light ink is not limited to 200%. Even when the light ink is ejected for applying to 200% or more, there can be density increase. Therefore, in the case where the gradation level that corresponds to the maximum applying amount of the light ink is the same as the gradation level at which the applying of the dark ink is started, if the maximum applying amount of the light ink is set to 200% or more, a density range B, shown in FIG. 17, where the dark ink is ejected for applying becomes narrower, and hence further reduction in the granularity can be achieved. Thus, in the case where the maximum applying amount of the light ink is equal to 200% or more, the first peak which is a maximum formation amount of the light dot for a unit area becomes 2 or more times the second peak (100%) which is the maximum formation amount of the dark dot for the unit area.

Alternatively, the maximum applying amount of the light ink may be set to 175% other than 200%. That is, in the case where the gradation level that corresponds to the maximum applying amount of the light ink is equal to the gradation level at which the applying of the dark ink is started, if the maximum applying amount of the light ink is set to 175%, the density range B (a width of the gradation levels) where the dark ink is ejected for applying shown in FIG. 17 becomes wider as compared to the case of 200%, but this density range B is still narrower than the density range B' (a width of the gradation levels) by the conventional LUT and the granularity can be reduced sufficiently. Therefore, it is allowed that the maximum applying amount of the light ink is at least 175% or more. Thus, in the case where the maximum applying amount is 175% or more, the first peak which is the maximum formation amount of the light dot for the unit area becomes 1.75 or more times the second peak (100%) which is the maximum formation volume of the dark dot for the unit area.

As described in the foregoing, according to the present invention, (1) for the light ink, the formation amount of the light dot is decided so that, as the density level rises, the formation amount of the light dot is gradually increased up to the first peak (for example, 200%) and, after reaching the first peak, it is gradually decreased, as shown by LUTs of FIG. 16 and FIG. 17, and (2) for the dark ink, the formation amount of the dark dot is decided in such a way that, in a range of density levels higher than the predetermined density level (namely, the density level at which the applying of the dark ink is started) which was equal to or lower than the density level that corresponds to the above-mentioned first peak, as the density level rises, the formation amount of the dark dot is gradually increased up to the second peak (100%) smaller than the above-mentioned first peak (200%). Thus, the formation amounts of the dark dot and of the light dot are decided according to the density level, whereby the formation amount of the light dot is increased, the density range that is formed only with the light dot is widened, and a density range that is formed partly or only with the dark dot whose granularity is easy to notice is narrowed, so that the granularity is reduced as a whole.

(Second Embodiment)

As described above, in the case where the LUT of FIG. 16 is used, since the input gradation level at which the applying of the dark ink is started is increased, consequently the medium-density range A from the applying of the dark ink is started, namely, a density range where the granularity tends to appear, can be narrowed and at the same time the density range B where the dark ink is ejected for applying can also be narrowed. On the other hand, an upper limit of the maximum applying amount of the ink is governed by the kind of the printing medium. Therefore, it is necessary to decide the input gradation level at which the applying of the dark ink is started so that the granularity of the dot is reduced in a range bounded by the maximum applying amount. However, if the maximum applying amount is increased to the upper limit, there may occur deterioration of an image due to overflow of the ink when the second color and the tertiary color are represented by mixing the ink with the ink of another color.

In this embodiment, in order to decide the input gradation level at which the applying of the dark ink is started, an evaluation formula that digitizes the granularity is used. For evaluation formula that digitizes the granularity, in addition to the evaluation formula that uses the granularity evaluation function, the Dooly and Shaw's evaluation formula using the Wiener spectrum and VTF etc. are known. In this example, the evaluation formula using the granularity evaluation function is used. The evaluation formula uses the granularity evaluation function that is derived by incorporating the human visual characteristic into the RMS granularity that is commonly used as an index for measuring the granularity in the silver halide photographic film, to evaluate the granularity. Concretely, an image P' obtained by putting the image P through a visual filter, namely, spatial frequency components P' obtained by putting the image P through FFT (fast Fourier transform) is found and the standard deviation Gb of the pixel values in the P' is defined as the granularity G. An observation distance in VTF(V) is assumed as 28.6 cm. Here, VTF(V) is a measured index indicating for how many levels of light and dark the human eye can distinguish for each spatial frequency (Dooly's approximation formula). The evaluation formula is shown below. The formula below has been presented in a literature, "Improving ink jet printer for high-quality image and its evaluation," by Tsuyoshi MAKITA and Jun USHIRODA (Canon Inc.).

$$G = \left\{ 1/(N^2 - 1) \sum_{i,j=1}^{N} (P'ij - \overline{P})^2 \right\}^{1/2}$$

$$\overline{P} = 1/N^2 \sum_{i,j=1}^{N} P'ij$$

$$P'ij = IFFT\{FFT(P'ij) \sum V(f)\}$$

$$V(f) = \begin{cases} 5.05e^{-0.138f}(1 - e^{-0.1f}) & : f \geq 5 \\ 1 & : f < 5 \end{cases}$$

Where i is a pixel position in X direction, j is a pixel position in Y direction, and N is a size of the image P in X direction and in Y direction.

Next, correlation between the granularity evaluation value (G) and the testee's test results was obtained. A printer used in the measurement is a BJF-850 printer manufactured by Canon (6-color, dark-and-light ink-jet printer, resolution 1200 dpi×1200 dpi, dot diameter 40 μm), and a drum scanner is a ScanMaster 4500, manufactured by Howtek. In this measurement, a uniform density patch (gray scale 50%) was outputted by the printer using K (black) ink and its output image was read by the drum scanner whose resolution was set to 1000 dpi. An input image by the drum scanner is divided into 1024×1024 (pixels), which are estimated using the granularity estimation function. FIG. 25 is the evaluation result.

From the granularity evaluation value (G) and the results of the testee's test of FIG. 25, it was found that the evaluation value of the density range A in FIG. 16 needs to be controlled to be not more than 0.6. Preferably, the evaluation value is controlled to be no more than 0.4, so that the granularity can be made small for the entire density range.

Moreover, when determining the ink density, the granularity evaluation function can be used as it is. For example, when deciding the density of the light ink, the density of the light ink is diluted to $1/3$, $1/4$, $1/5$, $1/6$, and whether or not the light ink dot of each density is noticeable in the highlight portion and whether or not the dark ink dot is noticeable in the medium-density portion are evaluated. The subjective evaluation and the granularity value are both used as information for making the decision. By this procedure, the ink density can be decided by considering the granularity in the highlight portion and that in the medium-density portion synthetically.

Using the granularity evaluation function, the ink density and the dot diameter are investigated in search of optimum values thereof that achieve a small granularity value equal to 0.4 or less for the entire density range. As a result, it was found that in a 6-color, dark-and-light ink-jet printer such as in this example, by setting the dot diameter to 30 μm (with an ejecting amount of 2 pl; note that a blotting ratio is set to about 2.0) and setting an ink dilution ratio of the light ink to $1/3$ that of the dark ink, the granularity can be diminished for the entire density range even with a maximum applying amount of the light ink being 100%.

Moreover, in this embodiment, two kinds of inks having different density are used only for cyan and magenta, but it may be all right that inks having different density are used for yellow and black as well, accommodating a wider combination of the inks. Naturally, the inks are not limited to the combination of C, M, Y, and K. The present invention may be applied to another combination of inks and, for special colors such as gold and silver, two kinds of inks having different density may be used.

Through the foregoing image processing, high-definition image printing with small granularity for the entire density range can be performed.

(Other Embodiment)

The printing head used in this invention is not specified to the ink-jet printing head for ejecting the ink, and any printing head may be used that is provided with a plurality of printing elements, which may be of various forms, each capable of forming a dot on the printing medium.

In the above-mentioned embodiment, it was described that gradation representation is performed for each unit scope of 600 dpi×600 dpi but the unit scope (unit area) in which gradation representation is performed is not limited to a unit scope of 600 dpi×600 dpi. For example, the gradation representation may be performed for each scope of 1200 dpi×1200 dpi, and the size of the unit area in which the gradation representation is performed is not limited to the values of the above-mentioned embodiments. Incidentally, in the foregoing, a phrase "the unit scope (unit area) that corresponds to the resolution of 600 dpi×600 dpi" is used, and the unit scope (unit area) that corresponds to the resolution of 600 dpi×600 dpi means an area that corresponds to ($1/600$) inch×($1/600$) inch. Similarly, the unit scope (unit area) that corresponds to the resolution of 1200 dpi× 1200 dpi means an area that corresponds to ($1/1200$) inch× ($1/1200$) inch, and the unit scope (unit area) that corresponds to the resolution of 1200 dpi×2400 dpi means an area that corresponds to ($1/1200$) inch×($1/2400$) inch.

Naturally, the object of the present invention can be achieved by the following steps: (1) a storage medium that stored a program code of software for implementing a function of the embodiment described above is supplied to a system or an apparatus, and (2) a computer (or a CPU or an MPU) of the system or the apparatus reads and executes the program code stored in the storage medium.

In this particular case, the program code itself read from the storage medium implements the function of the above-mentioned embodiment; therefore the storage medium that stored the program code constitutes part of the present invention.

For storage media wherewith the program code is supplied, for example, floppy disks, hard disks, optical disks, magneto-optical disks, CD-ROMs, CD-Rs, magnetic tapes, non-volatile memory cards, ROMs, etc. may be used.

Needless to say, the present invention includes not only the case where the computer executes the read program code, whereby the above-mentioned function of the embodiment is achieved, but also a case where an OS (operating system) running on a computer performs part of or all of actual processing according to instructions of the program code.

Further, needless to say, the present invention includes a case where the program code read from the storage medium is written into memory provided in a function enhancement board being inserted into the computer, or into memory provided in a function enhancement unit connected to the computer, and subsequently a CPU, etc., provided in the function enhancement board or the function enhancement unit performs part of or all of actual processing, and the function of the above-mentioned embodiment is achieved through the processing.

(Other)

The present invention achieves distinct effect when applied to a printing head or a printing apparatus which has means for generating thermal energy such as electrothermal transducers or laser light, and which causes changes in ink by the thermal energy so as to eject ink. This is because such a system can achieve a high density and high resolution printing.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet printing systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to printing information; second, the thermal energy induces sudden temperature rise that exceeds the nucleate boiling so as to cause the film boiling on heating portions of the printing head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better printing.

U.S. Pat. Nos. 4,558,333 and 4,459,600 disclose the following structure of a printing head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the printing head, the present invention can achieve printing positively and effectively.

The present invention can be also applied to a so-called full-line type printing head whose length equals the maximum length across a printing medium. Such a printing head may consist of a plurality of printing heads combined together, or one integrally arranged printing head.

In addition, the present invention can be applied to various serial type printing heads: a printing head fixed to the main assembly of a printing apparatus; a conveniently replaceable chip type printing head which, when loaded on the main assembly of a printing apparatus, is electrically connected to the main assembly, and is supplied with ink therefrom; and a cartridge type printing head integrally including an ink reservoir.

It is further preferable to add a recovery system, or a preliminary auxiliary system for a printing head as a constituent of the printing apparatus because they serve to make the effect of the present invention more reliable. Examples of the recovery system are a capping means and a cleaning means for the printing head, and a pressure or suction means for the printing head. Examples of the preliminary auxiliary system are a preliminary heating means utilizing electrothermal transducers or a combination of other heater elements and the electrothermal transducers, and a means for carrying out preliminary ejection of ink independently of the ejection for printing. These systems are effective for reliable printing.

The number and type of printing heads to be mounted on a printing apparatus can be also changed. For example, only one printing head corresponding to a single color ink, or a plurality of printing heads corresponding to a plurality of inks different in color or concentration can be used. In other words, the present invention can be effectively applied to an apparatus having at least one of the monochromatic, multi-color and full-color modes. Here, the monochromatic mode performs printing by using only one major color such as black. The multi-color mode carries out printing by using different color inks, and the full-color mode performs printing by color mixing.

Furthermore, although the above-described embodiments use liquid ink, inks that are liquid when the printing signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the printing medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the printing signal. In such cases, the ink may be retained in recesses or through holes formed in a porous sheet as liquid or solid substances so that the ink faces the electrothermal transducers as described in Japanese Patent Application Laid-open Nos. 54-56847 (1979) or 60-71260 (1985). The present invention is most effective when it uses the film boiling phenomenon to expel the ink.

Furthermore, the ink jet printing apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image processor comprising:
   generating means for generating data relating to respective applying amounts of low-concentration ink and high-concentration ink, which has a same type color as the low-concentration ink and has a higher concentration than that of the low-concentration ink, based on input image data for printing an image on a printing medium, the low-concentration and high-concentration inks being used for forming low-density dots and high-density dots on a unit area of the printing medium, wherein said generating means generates the data relating to the respective applying amounts of the low-concentration and the high-concentration inks based on the input image data so that, within a range from a low gradation level to a high gradation level of colors expressed by the input image data, as the gradation level rises, the applying amount of the low-concentration ink is gradually increased up to a first peak amount and after reaching the first peak amount, gradually decreased, and as the gradation level rises from a gradation level corresponding to the first peak amount or from a predetermined gradation level lower than the gradation level corresponding to the first peak amount, the applying amount of the high-concentration ink is gradually increased up to a second peak amount lower than the first peak amount, and wherein the number of levels of gradation representable by the dots formed on the unit area based on the data relating to the applying amount of the low-concentration ink is greater than the number of levels of gradation representable by the dots formed on the unit area based on the data relating to the applying amount of the high-concentration ink.

2. An image processor according to claim 1, wherein the applying amount of the low-concentration ink at the predetermined gradation level is 2 or more times the second peak amount.

3. An image processor according to claim 1, wherein the applying amount of the low-concentration ink at the predetermined gradation level is 1.75 or more times the second peak amount.

4. An image processor according to claim 1, wherein the first peak amount is 1.75 or more times the second peak amount.

5. An image processor according to claim 1, wherein the first peak amount is 2 or more times the second peak amount.

6. An image processor according to claim 1, wherein said generating means generates the data corresponding to the number of the low-density dots and the number of the high-density dots, both of which are to be formed for the unit area in accordance with the gradation level.

7. An image processor according to claim 6, wherein the number of the low-density dots that are formed for the unit area at the gradation level that corresponds to the first peak amount is 1.75 or more times the number of the high-density dots that are formed for the unit area at the gradation level that corresponds to the second peak amount.

8. An image processor according to claim 1, wherein a granularity G of the image by a granularity evaluation function is set to be 0.6 or less than 0.6, the image corresponding to respective gradation levels in the range from the predetermined gradation level to the gradation level corresponding to the second peak amount, and the granularity evaluation function for evaluating the granularity G that is the standard deviation of the pixel values in an image P' that was obtained by putting an image P through a visual filter being expressed by the following expression:

$$G = \left\{ 1/(N^2-1) \sum_{i,j=1}^{N} (P'ij - \overline{P})^2 \right\}^{1/2}$$

$$\overline{P} = 1/N^2 \sum_{i,j=1}^{N} P'ij$$

$$P'ij = IFFT\left\{ FFT(P'ij) \sum V(f) \right\}$$

$$V(f) = \begin{cases} 5.05e^{-0.138f}(1-e^{-0.1f}) & : f \geq 5 \\ 1 & : f < 5 \end{cases}$$

where i is a pixel position in an X direction, j is a pixel position in a Y direction, and N is a size of the image P in the X direction and in the Y direction.

9. An image processor according to claim 8, wherein the granularity G of the image by the granularity evaluation function is set to be 0.4 or less than 0.4, the image corresponding to respective gradation levels in the range from the predetermined gradation level to the gradation level corresponding to the second peak amount.

10. An image processing apparatus according to claim 1, wherein the input image data is multi-valued data of R, G and B, the data relating to the applying amount of the low-concentration ink is multi-valued data corresponding to magenta ink, and the data relating to the applying amount of the high-concentration ink is multi-valued data corresponding to a second magenta ink having a lower concentration than the magenta ink.

11. A printing apparatus comprising:

an image processor according to claim 1; and a printing portion for forming the low-density dots and the high-density dots on the printing medium in accordance with the data relating to respective applying amounts of the low-concentration and high-concentration inks generated by said image processor.

12. A control program stored on a computer-readable medium for controlling a printing apparatus according to claim 11.

13. An image processing apparatus according to claim 1, wherein the input image data is multiple-valued data of R, G and B.

14. An image processing apparatus according to claim 1, wherein the input image data is multiple-valued data of R, G and B, the data relating to the applying amount of low concentration ink is multi-valued data corresponding to cyan ink, and the data relating to the applying amount of high concentration ink is multi-valued data corresponding to a second cyan ink having a lower concentration than the cyan ink.

15. An image processing method comprising:

a generating step of generating data relating to respective applying amounts of low-concentration ink and high-concentration ink, which has a same type color as the low-concentration ink and has a higher concentration than that of the low-concentration ink, based on input image data for printing an image on a printing medium, the low-concentration and high-concentration inks being used for forming low-density dots and high-density dots on a unit area of the printing medium, wherein said generating step generates the data relating to the respective applying amounts of the low-concentration and the high-concentration inks based on the input image data so that, within a range from a low gradation level to a high gradation level of colors expressed by the input image data, as the gradation level rises, the applying amount of the low-concentration ink is gradually increased up to a first peak amount and after reaching the first peak amount, gradually decreased, and as the gradation level rises from a gradation level corresponding to the first peak amount or from a predetermined gradation level lower than the gradation level corresponding to the first peak amount, the applying amount of the high-concentration ink is gradually increased up to a second peak amount lower than the first peak amount, and wherein the number of levels of gradation representable by the dots formed on the unit area based on the data relating to the applying amount of the low concentration ink is greater than the number of levels of gradation representable by the dots formed on the unit area based on the data relating to the applying amount of the high-concentration ink.

16. A printing method comprising:

an image processing step for executing the image processing method according to claim 15; and a dot forming step for forming the low-density dots and the high-density dots on the printing medium in accordance with the data relating to respective applying amounts of the low-concentration and high-concentration inks generated in said image processing step.

17. An image processor comprising:

generating means for generating data relating to respective applying amounts of low concentration print material and high concentration print material that has a same type color as the low concentration print material and has a higher concentration than the low concentration print material, based on input image data for printing an image on a printing medium, the low and high concentration print materials including respective color materials and being used for forming low-density dots and high-density dots on a unit area of the printing medium, wherein said generating means generates the data relating to respective applying amounts of the low concentration and high concentration print materials based on the input image data, so that, within a range from a low gradation level to a high gradation level of colors expressed by the input image data, as the gradation level rises, the applying amount of the low concentration print material is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration print material is gradually increased up to a second peak amount smaller than the first peak amount, and wherein the number of levels of gradation representable by the dots formed on the unit area based on the data relating to the applying amount of the low concentration print material is greater than the number of levels of gradation representable by the dots formed on the unit area based on the data relating to the applying amount of the high concentration print material.

18. An image processor comprising:

generating means for generating multi-valued data corresponding to respective applying amounts of low concentration ink and high concentration ink that has a same type color as the low concentration ink and has a higher concentration than the low concentration ink, based on multi-valued data of R, G and B for printing an image on a printing medium, the low and high concentration inks to be applied on a unit area of the printing medium, wherein said generating means generates the multi-valued data corresponding to respective applying amounts of the low concentration and the high concentration inks based on the multi-valued data of R, G and B, so that, within a range from a low gradation level to a high gradation level of colors expressed by the multi-valued data of R, G and B, as the gradation level rises, the applying amount of the low concentration ink is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration ink is gradually increased up to a second peak amount smaller than the first peak amount, and wherein the number of levels of gradation representable for the unit area based on the multi-valued data corresponding to the low concentration ink is greater than the number of levels of gradation representable for the unit area based on the multi-valued data corresponding to the high concentration ink.

19. An image processor comprising:

generating means for generating data relating to respective applying amounts of low concentration ink and high concentration ink that has a same type color as the low concentration ink and has a higher concentration than the low concentration ink, based on input image data for printing an image on a printing medium, the low and high concentration inks being used for forming low-density dots and high-density dots on a unit area of the printing medium, wherein said generating means generates the data relating to respective applying amounts of the low concentration and the high concentration inks based on the input image data, so that, within a range from a low gradation level to a high gradation level indicative of a predetermined hue expressed by the input image data, as the gradation level rises, the applying amount of the low concentration ink is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration ink is gradually increased up to a second peak amount smaller than the first peak amount, and wherein the number of levels of gradation representable by the dots formed on the unit area based on the data relating the applying amount of the low concentration ink is greater than the number of levels of gradation representable by the dots formed on the unit area based on the data relating the applying amount of the high concentration ink.

20. An image processor comprising:

generating means for generating data relating to respective applying amounts of low concentration print material and high concentration print material that has a same type color as the low concentration print material and has a higher concentration than the low concentration print material, based on input image data for printing an image on a printing medium, the low and high concentration print materials including color materials and being used for forming low-density dots and high-density dots on a unit area of the printing medium, wherein said generating means generates the data relating to respective applying amounts of the low concentration and the high concentration print materials based on the input image data, so that, within a range from a low gradation level to a high gradation level indicative of a predetermined hue expressed by the input image data, as the gradation level rises, the applying amount of the low concentration print material is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration print material is gradually increased up to a second peak amount smaller than the first peak amount, and wherein the number of levels of gradation representable by the dots formed on the unit area based on the data relating to the applying amount of the low concentration print material is greater than the number of levels of gradation representable by the dots formed on the unit area based on the data relating to the applying amount of the high concentration print material.

21. An image processor comprising:

generating means for generating data relating to respective applying amounts of low concentration liquid and high concentration liquid that has a same type color as the low concentration liquid and has a higher concentration than the low concentration liquid, based on input image data for printing an image on a printing medium, the low and high concentration liquids being used for forming low-density dots and high-density dots on a unit area of the printing medium, wherein said generating means generates the data relating to respective applying amounts of the low concentration and the high concentration liquids based on the input image data, so that, within a range from a low gradation level to a high gradation level indicative of a predetermined hue expressed by the input image data, as the gradation level rises, the applying amount of the low concentration liquid is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration liquid is gradually increased up to a second peak amount smaller than the first peak amount, and wherein the number of levels of gradation representable by the dots formed on the unit area based on the data relating to the applying amount of the low concentration liquid is greater than the number of levels of gradation representable by the dots formed on the unit area based on the data relating to the applying amount of the high concentration liquid.

22. An image processor comprising:

generating means for generating data relating to respective applying amounts of low concentration ink and high concentration ink that has a same type color as the low concentration ink and has a higher concentration than the low concentration ink, based on color of a range from a low gradation level to a high gradation level of colors expressed by input image data for printing an image on a printing medium, the low and high concentration inks being used for forming low-density dots and high-density dots on a unit area of the printing medium, wherein said generating means generates the data relating to respective applying amounts of the low concentration and the high concentration inks based on the input image data, so that as the gradation level rises, the applying amount of the low concentration ink is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration ink is gradually increased up to a second peak amount smaller than the first peak amount, and wherein the number of levels of gradation representable by the dots formed on the unit area based on the data relating to the applying amount of the low concentration ink is greater than the number of levels of gradation representable by the dots formed on the unit area based on the data relating to the applying amount of the high concentration ink.

23. An image processing method comprising:

a generating step for generating multi-valued data corresponding to respective applying amounts of low concentration ink and high concentration ink that has a same type color as the low concentration ink and has a higher concentration than the low concentration ink, based on multi-valued data of R, G and B for printing an image on a printing medium, the low and high concentration inks for being applied on a unit area of the printing medium, wherein said generating step generates the multi-valued data corresponding to respective applying amounts of the low concentration and the high concentration inks based on the multi-valued data of R, G and B, so that, within a range from a low gradation level to a high gradation level of colors expressed by the multi-valued data of R, G and B, as the gradation level rises, the applying amount of the low concentration ink is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration ink is gradually increased up to a second peak amount smaller than the first peak amount, and wherein the number of levels of gradation representable for the unit area based on the multi-valued data corresponding to the low concentration ink is greater than the number of levels of gradation representable for the unit area based on the multi-valued data corresponding to the high concentration ink.

24. An image processing method comprising:

a generating step for generating data relating to respective applying amounts of low concentration ink and high concentration ink that has a same type color as the low concentration ink and has a higher concentration than the low concentration ink, based on input image data for printing an image on a printing medium, the low and high concentration inks being used for forming low-density dots and high-density dots on a unit area of the printing medium, wherein said generating step generates the data relating to respective applying amounts of the low concentration and the high concentration inks based on the input image data, so that, within a range from a low gradation level to a high gradation level indicative of a predetermined hue expressed by the input image data, as the gradation level rises, the applying amount of the low concentration ink is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration ink is gradually increased up to a second peak amount smaller than the first peak amount, and wherein the number of levels of gradation representable by the dots formed on the unit area based on the data relating to the applying amount of the low concentration ink is greater than the number of levels of gradation representable by the dots formed on the unit area based on the data relating to the applying amount of the high concentration ink.

25. An image processing method comprising:

a generating step for generating data relating to respective applying amounts of low concentration print material and high concentration print material that has a same type color as the low concentration print material and has a higher concentration than the low concentration print material, based on input image data for printing an image on a printing medium, the low and high concentration print materials including color materials and being used for forming low-density dots and high-density dots on a unit area of the printing medium, wherein said generating step generates the data relating to respective applying amounts of the low concentration and the high concentration print materials based on the input image data, so that, within a range from a low gradation level to a high gradation level indicative of a predetermined hue expressed by the input image data, as the gradation level rises, the applying amount of the low concentration print material is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration print material is gradually increased up to a second peak amount smaller than the first peak amount, and wherein the number of levels of gradation representable by the dots formed on the unit area based on the data relating to the applying amount of the low concentration print material is greater than the number of levels of gradation representable by the dots formed on the unit area based on the data relating to the applying amount of the high concentration print material.

26. An image processing method comprising:

a generating step for generating data relating to respective applying amounts of low concentration liquid and high concentration liquid that has a same type color as the low concentration liquid and has a higher concentration than the low concentration liquid, based on input image data for printing an image on a printing medium, the low and high concentration liquids being used for forming low-density dots and high-density dots on a unit area of the printing medium, wherein said generating step generates the data relating to respective applying amounts of the low concentration and the high concentration liquids based on the input image data, so that, within a range from a low gradation level to a high gradation level indicative of a predetermined hue expressed by the input image data, as the gradation level rises, the applying amount of the low concentration liquid is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration liquid is gradually increased up to a second peak amount smaller than the first peak amount, and wherein the number of levels of gradation representable by the dots formed on the unit area based on the data relating to the applying amount of the low concentration liquid is greater than the number of levels of gradation representable by the dots formed on the unit area based on the data relating to the applying amount of the high concentration liquid.

27. An image processing method comprising:

a generating step for generating data relating to respective applying amounts of low concentration ink and high concentration ink that has a same type color as the low concentration ink and has a higher concentration than the low concentration ink, based on color of a range from a low gradation level to a high gradation level of colors expressed by input image data for printing an image on a printing medium, the low and high concentration inks being used for forming low-density dots and high-density dots on a unit area of the printing medium, wherein said generating step generates the data relating to respective applying amounts of the low concentration and the high concentration inks based on the input image data, so that as the gradation level rises, the applying amount of the low concentration ink is gradually increased up to a first peak amount and after reaching the first peak amount, gradually decreased, and as the gradation level rises from a gradation level corresponding to the first peak amount or from a predetermined gradation level smaller than the gradation level corresponding to the first peak amount, the applying amount of the high concentration ink is gradually increased up to a second peak amount smaller than the first peak amount, and wherein the number of levels of gradation representable by the dots formed on the unit area based on the data relating to the applying amount of the low concentration ink is greater than the number of levels of gradation representable by the dots formed on the unit area based on the data relating to the applying amount of the high concentration ink.

* * * * *